(12) United States Patent
Embrey

(10) Patent No.: US 6,311,170 B1
(45) Date of Patent: Oct. 30, 2001

(54) METHOD AND APPARATUS FOR MAKING PAYMENTS AND DELIVERING PAYMENT INFORMATION

(76) Inventor: Mark C. Embrey, P.O. Box 1269, Steubenville, OH (US) 43952

(*) Notice: Subject to any disclaimer, the term of this patent is extended or adjusted under 35 U.S.C. 154(b) by 0 days.

(21) Appl. No.: 08/984,282

(22) Filed: Dec. 3, 1997

Related U.S. Application Data

(60) Provisional application No. 60/033,165, filed on Dec. 4, 1996.

(51) Int. Cl.[7] .................................................. G06F 15/21
(52) U.S. Cl. ....................................... 705/40; 705/39
(58) Field of Search ........................... 705/40, 39, 35, 705/30

(56) References Cited

U.S. PATENT DOCUMENTS 5,383,113 * 1/1995 Kight et al. ............................. 705/40

FOREIGN PATENT DOCUMENTS

WO 91/09370 A1 * 6/1991 (WO) ............................. G06F/15/30

OTHER PUBLICATIONS

Ebert, Stephen "Controlled disbursement jumps into new waters" Corporate Cashflow Magazine, v15, n12, p17 [retrieved on Jul. 7, 1999] retrieved from Dialog file: 75, Nov. 1994.*

Wells, Beverly, "Reinvent accounts payable, outsourcing to bank, to gain security, cost savings" Corporate Cashflow Magazine, v14, n2, p28 [retrieved on Jul. 7, 1999] retrieved from Dialog file:75, Feb. 1994.*

Radigan, US banker journal (v106n4 pp:54–58) Apr. 1996.*

* cited by examiner

Primary Examiner—Tod H. Swann
Assistant Examiner—Michelle Crecca
(74) Attorney, Agent, or Firm—Melvin A. Hunn

(57) ABSTRACT

When characterized as an improved method of making payments from a plurality of payor entities to a plurality of payee entities through a service provider, a number of method steps which will now be described. First, authorization is obtained from a plurality of payor entities which allows a service provider to make payments, on behalf of the plurality of payor entities, to a plurality of payee entities. Then at least one trusted intermediary financial institution is selected. The trusted intermediary financial institution periodically receives payment information and payment authorization from the plurality of payor entities. The trusted intermediary financial institution automatically transfers funds, in amounts only consistent with at least the payment information, to the service provider. Preferably, the payment information includes at least (1) an identification of each of the plurality of payee entities; (2) an identification of payment amounts for each of the plurality of payee entities; (3) a payment record identifier which is uniquely associated with each payment; and (4) an authorization code which is uniquely associated with each payment record identifier.

70 Claims, 36 Drawing Sheets

Authorization page for Exxon Mobil Corporation:

To pre-authorize electronic payments from the account specified below for disbursing revenues held in connection with the purchase of oil, gas, and other hydrocarbons from properties in which the payees noted on our Approved Pay Sheet own interests.

I, John Doe, agent for Exxon Mobil Corporation, pre-authorize electronic funds transfers from the account specified below to Revenue Distribution Systems, Inc., as detailed in our Approved Pay Sheet, delivered herewith, said Approved Pay Sheet being made a part of this agreement for all intents and purposes:

Bank Name
Address
City, State, Zip
Account Number
Signature
Date

Authorization page for United States Department of Health and Human Services:

To pre-authorize electronic payments from the account specified below for disbursing revenues held in connection with the purchase of oil, gas, and other hydrocarbons from properties in which the payees noted on our Approved Pay Sheet own interests.

I, John Doe, agent for United States Department of Health and Human Services, pre-authorize electronic funds transfers from the account specified below to Revenue Distribution Systems, Inc., as detailed in our Approved Pay Sheet, delivered herewith, said Approved Pay Sheet being made a part of this agreement for all intents and purposes:

Bank Name
Address
City, State, Zip
Account Number
Signature
Date 313
315
317
319

Authorization page for Ford Motor Company:

To pre-authorize electronic payments from the account specified below for disbursing revenues held in connection with the purchase of oil, gas, and other hydrocarbons from properties in which the payees noted on our Approved Pay Sheet own interests.

I, John Doe, agent for Ford Motor Company, pre-authorize electric funds transfers from the account specified below to Revenue Distribution Systems, Inc., as detailed in our Approved Pay Sheet, delivered herewith, said Approved Pay Sheet being made a part of this agreement for all intents and purposes:

Bank Name
Address
City, State, Zip
Account Number
Signature
Date

313 — (Authorization page line)
315 — (To pre-authorize paragraph)
317 — (I, John Doe paragraph)
319 — (Bank Name block)

*Figure 7*

Format Report for Check Detail

Page 1                1994.12.20

Created:              1994.06.15

Last Changed:         1994.12.20

| Position | Length | Data Element | Data Type | Notes |
|---|---|---|---|---|
| 1-2 | 2 | Industry Code | Alphanumeric | Must be "OG" |
| 3-4 | 2 | Record Type | Alphanumeric | Must be "CD" |
| 5-7 | 3 | Company Code | Alphanumeric | |
| 8-22 | 15 | Serial Number | Alphanumeric | |
| 23-32 | 10 | Payee Code | Alphanumeric | |
| 33-47 | 15 | Property Code | Alphanumeric | |
| 48-55 | 8 | Sales Start Date | Numeric | In the form YYYYMMDD |
| 56-63 | 8 | Sales End Date | Numeric | In the form YYYYMMDD |
| 64-65 | 2 | Product Code | Alphanumeric | |
| 66-67 | 2 | Transaction Code | Numeric | |
| 68-77 | 10 | Owner Decimal | Numeric | Decimal implied |
| 78-79 | 2 | Interest Type | Alphanumeric | |
| 80-94 | 15 | Detail Amount | Numeric | Decimal implied | etc., etc., ...

NOTE: Please see Data Dictionary for further explanation of data elements.

*Figure 11*

Format Report for Check Detail

Page 1             1994.12.20

Created:           1994.06.15

Last Changed:      1994.12.20

| Position | Length | Data Element | Data Type | Notes |
|----------|--------|--------------|-----------|-------|
| 1-2 | 2 | Industry Code | Alphanumeric | Must be "US" |
| 3-4 | 2 | Record Type | Alphanumeric | Must be "CD" |
| 5-7 | 3 | Agency Code | Alphanumeric | |
| 8-22 | 15 | Serial Number | Alphanumeric | |
| 23-32 | 10 | Payee Code | Alphanumeric | |
| 33-47 | 15 | Reference Code | Alphanumeric | |
| 48-55 | 8 | Payment Start Date | Numeric | In the form YYYYMMDD |
| 56-63 | 8 | Payment End Date | Numeric | In the form YYYYMMDD |
| 64-65 | 2 | Transaction Code | Numeric | |
| 66-67 | 2 | Detail Amount | Numeric | Decimal Implied | etc., etc., ...

NOTE: Please see Data Dictionary for further explanation of data elements.

*Figure 12*

Format Report for Check Detail

Page 1           1994.12.20
Created:         1994.06.15
Last Changed:    1994.12.20

| Position | Length | Data Element    | Data Type    | Notes                   |
|----------|--------|-----------------|--------------|-------------------------|
| 1-2      | 2      | Industry Code   | Alphanumeric | Must be "WS"            |
| 3-4      | 2      | Record Type     | Alphanumeric | Must be "CD"            |
| 5-7      | 3      | Company Code    | Alphanumeric |                         |
| 8-22     | 15     | Serial Number   | Alphanumeric |                         |
| 23-32    | 10     | Payee Code      | Alphanumeric |                         |
| 33-47    | 15     | Reference Code  | Alphanumeric |                         |
| 48-55    | 8      | Start Date      | Numeric      | In the form YYYYMMDD    |
| 56-63    | 8      | End Date        | Numeric      | In the form YYYYMMDD    |
| 64-78    | 15     | Detail Amount   | Numeric      | Decimal implied         | etc., etc., ...

NOTE: Please see Data Dictionary for further explanation of data elements.

*Figure 13*

```
OGCDXON000000000007560124648795440   00000000054619700000109    G0200156250000RI000000000001253
OGCDXON000000000007560124648795440   00000000054660200000109    G0300052266670R0000000000000511
OGCDXON000000000007560124648795440   00000000059835108941094    G0201000000000RI000000000000305
OGCSXON000000000007560124648795440   000000000000206
OGCDXON00000000000756013469550231    00000000040918600000109    G0181250000000WI000000000005689154
OGCSXON00000000000756013469550231    000000000056891
etc., etc., ...
OGERXON00000000023411000008367618344151194195645
```

*Figure 17*

```
WSCDFHC0000000000049276253948210  00000000000001948000010940000000005300
WSCSFHC0000000000049276253948210  0000000000005300
WSCDFHC0000000000049277279023111  00000000000001948000010940000000001698000
WSCDFHC0000000000049277279023111  0000000001698000
WSCDFHC0000000000049277279023111  00000000000001948000010940000000010600
WSCDFHC0000000000049277279023111  0000000000010600
etc., etc., ...
WSERFHC00001068910000015884329720119404163
```

Format Report for Approved Pay Sheet (Subscriber to TIFI)

Page 1                    1994.12.20

Created:                  1994.06.15

Last Changed:             1994.12.20

| Position | Length | Data Element         | Data Type    | Notes            |
|----------|--------|----------------------|--------------|------------------|
| 1-2      | 2      | Record Type          | Alphanumeric | Must be "AP"     |
| 3-5      | 3      | Company Code         | Alphanumeric |                  |
| 6-20     | 15     | Serial Number        | Alphanumeric |                  |
| 21-35    | 15     | Authorization Code   | Alphanumeric |                  |
| 36-45    | 10     | Payee Code           | Alphanumeric |                  |
| 46-60    | 15     | Payment Amount       | Numeric      | Decimal implied  | etc., etc., ...

NOTE: Please see Data Dictionary for further explanation of data elements.

*Figure 21*

Format Report for Positive Pay Check Detail Record

Page 1          1994.12.20

Created:        1994.06.15

Last changed:   1994.12.20

| Position | Length | Data Element     | Data Type    | Notes            |
|----------|--------|------------------|--------------|------------------|
| 1-2      | 2      | Report Code      | Alphanumeric | Must be "PP"     |
| 3-4      | 2      | Record Type      | Alphanumeric | Must be "CD"     |
| 5-12     | 8      | Check Number     | Alphanumeric |                  |
| 13-15    | 3      | Company Code     | Alphanumeric |                  |
| 16-30    | 15     | Serial Number    | Alphanumeric |                  |
| 31-45    | 15     | Check Sub-Amount | Alphanumeric | Decimal implied  | etc., etc., ...

NOTE: Please see Data Dictionary for further explanation of data elements.

*Figure 23B*

```
PPCD00748217XON        8542A89710000000001707
PPCD00748217GPM           9825100000000000785            JAMES EARL JONES
PPCS00748217000000002492
PPCD00748218AHC       A426502000008524922
etc., etc., . .
PPER0010585543000047566213685950124111532
```

*Figure 25*

Data Dictionary

Page 1        1994.12.21

Created:      1994.06.15

Last changed: 1994.12.21

| Data Element | Length | Data Type | Definition |
| --- | --- | --- | --- |
| Check Amount | 15 | Numeric | The total funds remitted from the paying entity (Subscriber) to payee for the subject pay period. |
| Company Code | 3 | Alphanumeric | A three letter code assigned by the provider to identify the subscriber. |
| Detail Amount | 15 | Numeric | The funds remitted from the paying entity (Subscriber) to the Payee for one of one or more entries to be paid for the subject pay period. |
| Distribution Total | 15 | Numeric | The sum of all funds being disbursed for the subject pay period. |
| Industry Code | 2 | Alphanumeric | A unique two letter code identifying the industry and transmission formats of the Subscriber. |
| Interest Type | 2 | Alphanumeric | A two letter code representing the type of interest. WI = Working Interest, RI = Royalty Interest, OR = Overriding Royalty Interest, etc. etc., ... |
| Number of Checks | 10 | Numeric | Number of (would be) checks represented in the subject transmission. | etc., etc., ...

1103 — The enclosed check is delivered in payment for the sale of oil, gas or other hydrocarbons, and on behalf of the company or companies listed below, and for the respective property and product sale dates.

ExxonMobil

1105

1107 — The following payments are made on behalf of Exxon Mobil Corporation, P. O. Box 5050, Dallas, Texas 75210, to John C. Doe, a.k.a J. Clarence Doe.
All matters concerning these payments should be addressed to Exxon Mobil Corporation.

| Item | Operator / Lease Name (1109/1111) | County / State (1113) | Lease ID / Your Decimal (1115) | Sale Date / Interest Type (1117) | Product / Unit Price (1119) | Lease Volume / Your Volume (1121) | Lease Value / Your Value (1123) | Lease Tax / Your Tax (1125) | Lease Net / Your Net (1127) |
|---|---|---|---|---|---|---|---|---|---|
| 1 | John L. Cox / Crespi | Midland / Texas | 0258-026568 / 0.00500000 | Sep 94 / Override | Gas / 1.97 | 908.00 / 4.54 | 1,788.76 / 8.94 | 85.03 / 0.43 | 1,703.73 / 8.52 |
| 2 | Parker & Parsley / Oldham "C" #1 | Midland / Texas | 0258-063054 / 0.000286660 | Sep 94 / Override | Gas / 1.76 | 896.00 / 0.26 | 1,575.17 / 0.45 | 75.36 / 0.02 | 1,499.81 / 0.43 |
| 3 | Autry C. Stephens / Oldham "C" #1 | Midland / Texas | 0258-065005 / 0.000286660 | Sep 94 / Override | Gas / 1.76 | 2,875.00 / 2.41 | 5,494.13 / 4.61 | 261.61 / 0.22 | 5,232.51 / 4.39 |

Total payments remitted on behalf of Exxon Mobil Corporation ... 1133  14.01  1135  0.67  1137  $13.34

1131

1139

1141 — The following payments are made on behalf of Shell Oil Corporation, P. O. Box 1907, Houston, Texas 77210, to John C. Doe, a.k.a J. Clarence Doe.
All matters concerning these payments should be addressed to Shell Oil Corporation.

| Item | Operator / Lease Name (1143) | County / State (1145) | Lease ID / Your Decimal (1147) | Sale Date / Interest Type (1149) | Product / Unit Price (1151) | Lease Volume / Your Volume (1153) | Lease Value / Your Value (1155) | Lease Tax / Your Tax (1157) | Lease Net / Your Net (1159) |
|---|---|---|---|---|---|---|---|---|---|
| 1 | Parker & Parsley / Ringo "A" | Reagan / Texas | 48249000 / 0.03125000 | Sep 94 / Royalty | Oil / 16.25 | 165.09 / 5.16 | 2,682.71 / 83.83 | 121.55 / 3.80 | 2,561.16 / 80.04 |
| 2 | BTA Oil Broducers / Oldham "C" #1 | Garza / Texas | 48521000 / 0.000286660 | Sep 94 / Override | Oil / 16.25 | 365.83 / 11.43 | 5,944.74 / 185.77 | 269.34 / 8.42 | 5,675.40 / 177.36 |

Total payments remitted on behalf of Shell Oil Corporation ... 1165  269.61  1167  12.22  1169  $257.39

1163 etc., etc., ...

1203 — The enclosed check is delivered in payment for the government agency or agencies listed below.

1205

1209

1207 — The following payment is made on behalf of the United States Department of Health and Human Services.

| 1211 Payment Period | 1213 Description | 1215 Amount |
|---|---|---|
| October 1994 | Social Security Benefits | 587.16 |

1217

1219

1221 — The following payment is made on behalf of the United States Treasury.

| 1225 Payment Period | 1227 Description | 1229 Amount |
|---|---|---|
| October 1994 | 1993 refund of overpayment | 1,706.02 |
| October 1994 | Interest of refund | 5.68 |

1231 — Total payment remitted on behalf of the United States Treasury ... $1,711.70  1235

1233 — etc., etc., ...

1303 — The enclosed check is delivered as payment for dividends in connection with your ownership of stock in the company or companies listed below.

1305 — *Ford Motor Company* 1307 — The following payment is made on behalf of Ford Motor Company for your shares owned on November 15, 1994.

1309  1311 — Shares Owned   1313 — Dividend per share   1315 — Amount 463-58-6277   8,045   $1.04   $8,366.80

1317

1319 — TEXAS INSTRUMENTS 1321 — The following payment is made on behalf of Texas Instruments, Incorporated for your shares owned on November 15, 1994.

1323 — Account   1325 — Shares Owned   1327 — Dividend per share   1329 — Amount 463-58-6277   15,865   $1.00   $15,865.00 etc., etc., ....

1331

The following information relates to payment for the sale of oil, gas or other hydrocarbons, and made by or on behalf of the company or companies listed below, and for the respective property and product sale dates.

ExxonMobil

The following payments are made on behalf of Exxon Mobil Corporation, P. O. Box 5050, Dallas, Texas 75210, to John C. Doe, a.k.a J. Clarence Doe.
All matters concerning these payments should be addressed to Exxon Mobil Corporation.

| Item | Operator<br>Lease Name | County<br>State | Lease ID<br>Your Decimal | Sale Date<br>Interest Type | Product<br>Unit Price | Lease Volume<br>Your Volume | Lease Value<br>Your Value | Lease Tax<br>Your Tax | Lease Net<br>Your Net |
|---|---|---|---|---|---|---|---|---|---|
| 1 | John L. Cox<br>Crespi | Midland<br>Texas | 0258-026568<br>0.00500000 | Sep 94<br>Override | Gas<br>1.97 | 908.00<br>4.54 | 1,788.76<br>8.94 | 85.03<br>0.43 | 1,703.73<br>8.52 |
| 2 | Parker & Parsley<br>Oldham "C" #1 | Midland<br>Texas | 0258-063054<br>0.000286660 | Sep 94<br>Override | Gas<br>1.76 | 896.00<br>0.26 | 1,575.17<br>0.45 | 75.36<br>0.02 | 1,499.81<br>0.43 |
| 3 | Autry C. Stephens<br>Oldham "C" #1 | Midland<br>Texas | 0258-065005<br>0.000286660 | Sep 94<br>Override | Gas<br>1.76 | 2,875.00<br>2.41 | 5,494.13<br>4.61 | 261.61<br>0.22 | 5,232.51<br>4.39 |

Total payments remitted on behalf of Exxon Mobil Corporation ...     14.01     0.67     $13.34

The following payments are made on behalf of Shell Oil Corporation, P. O. Box 1907, Houston, Texas 77210, to John C. Doe, a.k.a J. Clarence Doe.
All matters concerning these payments should be addressed to Shell Oil Corporation.

| Item | Operator<br>Lease Name | County<br>State | Lease ID<br>Your Decimal | Sale Date<br>Interest Type | Product<br>Unit Price | Lease Volume<br>Your Volume | Lease Value<br>Your Value | Lease Tax<br>Your Tax | Lease Net<br>Your Net |
|---|---|---|---|---|---|---|---|---|---|
| 1 | Parker & Parsley<br>Ringo "A" | Reagan<br>Texas | 48249000<br>0.03125000 | Sep 94<br>Royalty | Oil<br>16.25 | 165.09<br>5.16 | 2,682.71<br>83.83 | 121.55<br>3.80 | 2,561.16<br>80.04 |
| 2 | BTA Oil Producers<br>Oldham "C" #1 | Garza<br>Texas | 48521000<br>0.000286660 | Sep 94<br>Override | Oil<br>16.25 | 365.83<br>11.43 | 5,944.74<br>185.77 | 269.34<br>8.42 | 5,675.40<br>177.36 |

Total payments remitted on behalf of Shell Oil Corporation ...     269.61     12.22     $257.39 etc., etc., ...

*Figure 34*

METHOD AND APPARATUS FOR MAKING PAYMENTS AND DELIVERING PAYMENT INFORMATION

CROSS-REFERENCE TO RELATED APPLICATIONS

This application claims the benefit of U.S. Provisional Patent Application Ser. No. 60/033,165; filed Dec. 4, 1996, entitled Method and Apparatus for Making Payments and Delivering Payment Information.

BACKGROUND OF THE INVENTION

1. Field of the Invention

The present invention in general relates to automated techniques for making payments, and in particular relates to systems for consolidating and streamlining payment activities through the utilization of a third party payment service provider. The present invention also relates to a system which allows for the delivery of payment information independent of the payment activity.

2. Description of the Prior Art

Accounting and disbursement procedures for oil and gas activities are rather complicated. Typically, the oil and/or gas producing properties have royalty and working interest payments which are due many times throughout the year to a large number of individuals. As time passes, the number of individuals and companies who expect, and do, receive payment from the party responsible for the payment of funds increases, while the amounts due to them decreases. An increase in the number of payees occurs as royalty and working interests are passed down through the generations and amounts due to the payees decreases, both due both to this division of ownership, and declining production from the properties. In some cases, the payments are so small that the transaction costs associated with making the distributions are disproportionately and uneconomically large. Sometimes, the printing, postage and administrative costs are significant when compared to the payment due to those individuals having a marginal or negligible interest in the property.

A similar problem occurs in the accounting and payment activities for governmental entitlement programs. This is especially true since typically each entitlement program has an associated accounting and disbursement burden. The standards for eligibility to the available entitlement programs include common factors such as income level, age, and disability status. A citizen that is entitled to benefits under one entitlement program is generally eligible for entitlement benefits from other types of entitlement programs. Therefore, there is considerable duplication of efforts in the accounting and disbursement systems for governmental entitlement programs.

Similar problems arise for the accounting and disbursement systems for investment instruments such as stocks and bonds. Payments, such as dividends, are typically made at least once a year for such financial instruments. If a company's economic performance is poor, the dividends may be small or negligible in value. Additionally, over the last decade, an increase in investment activities by relatively small unsophisticated investment entities, (e.g., individuals) has resulted in smaller and smaller blocks of stock being held for long intervals by such entities. The cost and burden associated with the reporting and payment of dividends to such small investors are significant. In some instances, the printing, postage and administrative costs are significant when compared to the dividend amounts actually paid.

The three specific examples discussed above (the oil and gas industry, government entitlement programs, and the investment industry) share common features. First, a payment obligation exists for a multitude of payor entities. A relatively large number of payee entities expect regular payments from the payors. Secondly, it is likely that any particular payee entity expects payments from multiple payor entities. For example, an individual who actively invests in oil and gas exploration projects is likely to expect payments from several payor entities. Likewise an unemployed, disabled, or impoverished individual is likely to expect multiple payments from governmental entities under a variety of entitlement programs. Likewise, an investor is likely to expect regular dividends from multiple payor entities. Third, the payments being made from the payor entities to the payee entities is frequently disproportionately small in comparison with the administrative and direct expenses associated with making such payment. For example, in the oil and gas industry, it is common for an investor to receive relatively small (and frequently decreasing) royalty or working interest payments from payor entities. Likewise, as governmental entitlement programs are reduced in size and scope due to budget constraints, the payments which are made from the payor entities to the payee entities are decreasing in amount, while the expense associated with administering and making payments increases at least in an amount comparable to inflation. Likewise, in economic downturns, it is not uncommon for an investor to receive rather insignificant dividends from a variety of payor entities. Fourth, while the expense associated with making such payments may be large in comparison to the amount of the payments, such payments must nevertheless be made with regularity in order to prevent the loss of investor confidence (in the case of the oil and gas or investment industries) and in order to fulfill statutory and regulatory obligations (in the case of the oil and gas industry and entitlement programs). Fifth, independently of how payments are made, a relatively large number of entities may expect from the payors periodic reporting relating to the payments which are mandated by contract, statute, or regulation.

Numerous other commercial and financial arrangements exist which present similar problems, insofar as the administrative and expense burden associated with an accounting and distribution system is frequently disproportionately large in comparison with the amount of the payments being made. These other examples will not be discussed in this present application, in order to simplify this description, but can nonetheless be improved through the present invention.

SUMMARY OF THE INVENTION

It is one objective of the present invention to provide an improved method and apparatus for making payments which allows a service provider to make payments, on behalf of a plurality of payor entities, to a plurality of payee entities, in a manner which greatly reduces the operating and administrative costs for accounting and disbursement activities, and which greatly streamlines and consolidates the payment activities and provides highly organized and consolidated information to the plurality of payee entities.

It is another objective of the present invention to provide an improved method of making payments which allows the service provider to achieve the foregoing efficiencies in coordinated activity with at least one trusted intermediary financial institution, which transfers funds between the plurality of payor entities, the service provider, and the plurality of payee entities in a manner which maximizes security and accountability, and which in particular minimizes the opportunity for fraudulent activities by either the service provider or by payee entities (or individuals falsely presenting themselves as payee entities).

It is another objective of the present invention to attain the foregoing objectives in a highly automated manner, and in particular in a manner which relies heavily upon the electronic communication of data and the electronic transferring of funds.

These and other objectives are achieved as is now described. When characterized as an improved method of making payments from a plurality of payor entities to a plurality of payee entities through a service provider, the invention consists of a number of method steps which will now be described. First, authorization is obtained from a plurality of payor entities which allows a service provider to make payments, on behalf of the plurality of payor entities, to a plurality of payee entities. Then at least one trusted intermediary financial institution is selected. The trusted intermediary financial institution periodically receives payment information and payment authorization from the plurality of payor entities. The trusted intermediary financial institution automatically transfers funds, in amounts only consistent with the payment information, to the service provider upon verification of payment authorization. Preferably, the payment information includes at least (1) an identification of each of the plurality of payee entities; (2) an identification of payment amounts for each of the plurality of payee entities; (3) a payment record identifier (also referred to as a "virtual check number") which is uniquely associated with each payment; and (4) an authorization code which is uniquely associated with each payment record identifier.

Additionally, payment instructions are periodically communicated from the plurality of payor entities to the service provider. The payment information includes at least (1) an identification of each of the plurality of payee entities, (2) an identification of payment amounts for each of the plurality of payee entities; and (3) a payment record identifier which is uniquely associated with each payment amount such as a "virtual check number".

Then, the service provider is utilized to (1) consolidate payment instructions from the plurality of payor entities, (2) direct a negotiable instrument, in an amount equal to the consolidated payments, to each of the plurality of payee entities, (3) generate payment verification information for the negotiable instruments (such as "positive pay" data), and (4) communicate the payment verification information to the trusted intermediary financial institution. Upon receipt of the negotiable instrument from any of the plurality of payee entities, the trusted intermediary financial institution is utilized to (1) verify the request for payment, and (2) automatically transfer funds between the plurality of payor entities and the service provider in amounts necessary to allow payment (or "honoring of") the negotiable instrument.

This improved method of making payments is highly advantageous for at least the following reasons:

(1) The present invention increases efficiency and decreases cost in accordance with economy-of-scale principles. The service provider is utilized to consolidate payment information and payments, from any number of payor entities, in a manner which eliminates the duplication of effort and expenses inherent in the uncoordinated operation of the payors' accounting and disbursement systems. Additionally, the cost benefits associated with the outsourcing of services can be obtained.

(2) The present invention increases efficiency and decreases cost without introducing any increased business risk. While the service provider acts as a payment agent for the plurality of payor entities, the trusted intermediary financial institution is able to tightly control the flow of funds, so that the service provider need not be trusted with large sums; the trusted intermediary financial institution may be a well known and trusted financial institution, such as a bank, so the funds for the payments are not exposed to any unnecessary or unusual commercial risks; alternatively, the trusted intermediary financial institution may be any trusted institution that will direct the transfer of funds from one or more banks.

(3) The present invention enhances the communication of information to the payee entities. A substantial amount of payment information can be passed from the payor entities, through the service provider, to the payee entities; this information may be arranged in a manner which renders the information more useful to the payee entities, making it easier to keep accurate financial records for internal accounting, reporting, and tax filing activities.

(4) The present invention allows the payor entities to maintain general control over the payment process. The payment information and payment authorization which is communicated from the plurality of payor entities to the trusted intermediary financial institution includes an authorization code which is uniquely associated with each payment; however, this authorization code is not communicated or revealed to the service provider, and provides a means for allowing secure communication between a particular payor entity and the trusted intermediary financial institution.

(5) The present invention increases security of a payment system by minimizing the opportunity for alteration of the negotiable instruments. The service provider consolidates payments and generates a negotiable instrument which is either communicated electronically or through conventional postal services to the plurality of payee entities. For each negotiable instrument (whether in electronic form or in printed check form) the service provider generates payment verification information (such as "positive pay" information) which is communicated to the trusted intermediary financial institution. When the negotiable instruments are presented to the trusted intermediary financial institution, the payment verification information is utilized to verify the request for payment, to minimize the opportunity for fraudulent manipulation or reconstruction of a negotiable instrument with an altered payment amount or altered check number; therefore, the payment verification information typically includes an identification of the negotiable instrument and an identification of the amount of the negotiable instrument. The service provider can compare a presented negotiable instrument for both the identification of the payee for the instrument and the amount of the instrument in order to avoid making payment on a negotiable instrument which has been fraudulently manipulated or reconstructed to alter the identity of the payee or the check number or the amount due. This greatly increases the security of the payment system.

(6) The present invention allows the payor entities maximum control and use of the funds set aside for the payments. Upon presentation of a negotiable instrument, the trusted intermediary financial institution will make automatic funds transfers to move funds between the bank accounts of particular ones of the plurality of payor entities and the service provider. This is advantageous insofar as it allows the plurality of payor entities to maintain control of the funds and obtain, where permissible, interest on, or otherwise use, the funds which have been set aside for the payments up until the time that the negotiable instrument is actually presented to the trusted intermediary financial institution in a demand for payment. Typically, the payor entities are sufficiently large and sophisticated to maximize the use of capital, even for relatively short intervals. It is advantageous that the present invention does not require that funds be deposited with, or held by, the service provider; consequently, the payor entities have the benefit of an interval of use of these funds which is comparable to the "float" that can be obtained by utilizing negotiable instruments.

(7) The present invention allows for the maximum use of data processing systems in effecting payment. Payment information and payment instructions may be retrieved and organized utilizing data processing implemented instructions. The payment information and payment instructions may be provided to the service provider in digital form, and may be communicated over a distributed data processing system. Likewise, the payment authorization and payment instructions may be communicated electronically to the at least one trusted intermediary financial institution. The payment verification information may be communicated electronically to the at least one trusted intermediary financial institution. Additionally, the funds transfers may be accomplished utilizing conventional electronic funds transfers, such as E.F.T. or E.D.I.B.A.N.X.

In one particular embodiment of the present invention, a service provider may be utilized to consolidate and deliver payment information from a plurality of payor entities to a plurality of payee entities, even though the service provider may not perform payment activities on behalf of the plurality of payor entities. This provides a significant advantage over the prior art, insofar as it allows the plurality of payor entities to satisfy financial obligations, without personally satisfying the associated reporting obligation. This minimizes the administrative and other costs associated with making of payments, and thus allowing the payor entities to efficiently "outsource" the reporting obligations, while maintaining tight control over the satisfaction of the payment obligations.

These objectives may be obtained by the improved method of delivering payment information according to the present invention. To characterize this method, the invention is directed to an improved method of delivering payment information from a plurality of payor entities to a plurality of payee entities coordinated in operation of the plurality of payor entities in the information service provider. At least one data processing system is utilized to sort and format payment information of the plurality of entities concerning the plurality of payment obligations. Payment information is communicated to the information service provider. At least one data processing system is utilized, which is under the control of the information service provider, to consolidate the payment information concerning the plurality of payment obligations from a plurality of payor entities in accordance with at least one predetermined consolidation criterion. Preferably, the predetermined consolidation criterion comprises grouping the payment information by for each payee identity, in order to obtain efficiencies in reporting information due a plurality of payees. Then, the payments are directed to the plurality of payees by the plurality of payors in order to satisfy the plurality of payment obligations. The information service provider operates independently of the plurality of payors to direct consolidated payment information to the plurality of payees, without requiring active interaction between the information service provide and the plurality of payees. Preferably, the consolidated payment information is communicated either electronically or in printed format from the information service provider to the plurality of payees. The plurality of payees are not required to interact, electronically, or otherwise, with the information service provider in order to obtain this information. In alternative embodiments, the plurality of payor entities may utilize one service provider to direct negotiable instruments to the plurality of payees, while using another service provider to direct consolidated financial information (such as payment information) to the plurality of payees, with each of the service providers operating independently of one another.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5, 6, and 7 are pictorial representations of authorizations for payment in accordance with the preferred embodiment of the improved payment system of the present invention;

FIG. 11 is a pictorial representation of a format report for a check detail report for oil and gas revenue distributions, in accordance with one embodiment of the present invention;

FIG. 12 is a pictorial representation of a format report for a check detail report for government agency distributions, in accordance with one embodiment of the present invention;

FIG. 13 is a pictorial representation of a format report for a check detail report for stock dividend distribution, in accordance with one embodiment of the present invention;

FIGS. 17, 18, 19, and 20 depict and describe a data block which is generated in accordance with one preferred embodiment of the present invention, which is utilized to communicate payment information to a service provider;

FIG. 21 is a pictorial representation of a format report for an approved pay sheet which is communicated from a particular payor entity to a particular trusted intermediary financial institution;

FIGS. 23A, 23B, and 23C are pictorial representation of a format report for a positive pay report which is provided by a service provider to a trusted intermediary financial institution, and which is utilized to verify a demand for payment when a negotiable instrument is presented to the trusted intermediary financial institution by a payee;

FIG. 25 is a pictorial representation of an exemplary positive pay transmission from a service provider to a trusted intermediary financial institution, in accordance with one particular embodiment of the present invention;

FIG. 26 is a pictorial representation of a data dictionary which may be utilized in conjunction with several of the foregoing figures to define particular data fields;

FIG. 27 is a pictorial representation of an exemplary report which may be provided by a service provider in accordance with the present invention to a particular payee, for the oil and gas industry;

FIG. 28 is a pictorial representation of an exemplary report which may be provided by a service provider in accordance with the present invention to a particular payee, for government entitlement and other programs;

FIG. 29 is a pictorial representation of an exemplary report which may be provided by a service provider in accordance with the present invention to a particular payee, for stock dividend payments;

FIG. 34 is a pictorial representation of an exemplary informational report.

DETAILED DESCRIPTION OF THE INVENTION

Figure 1:
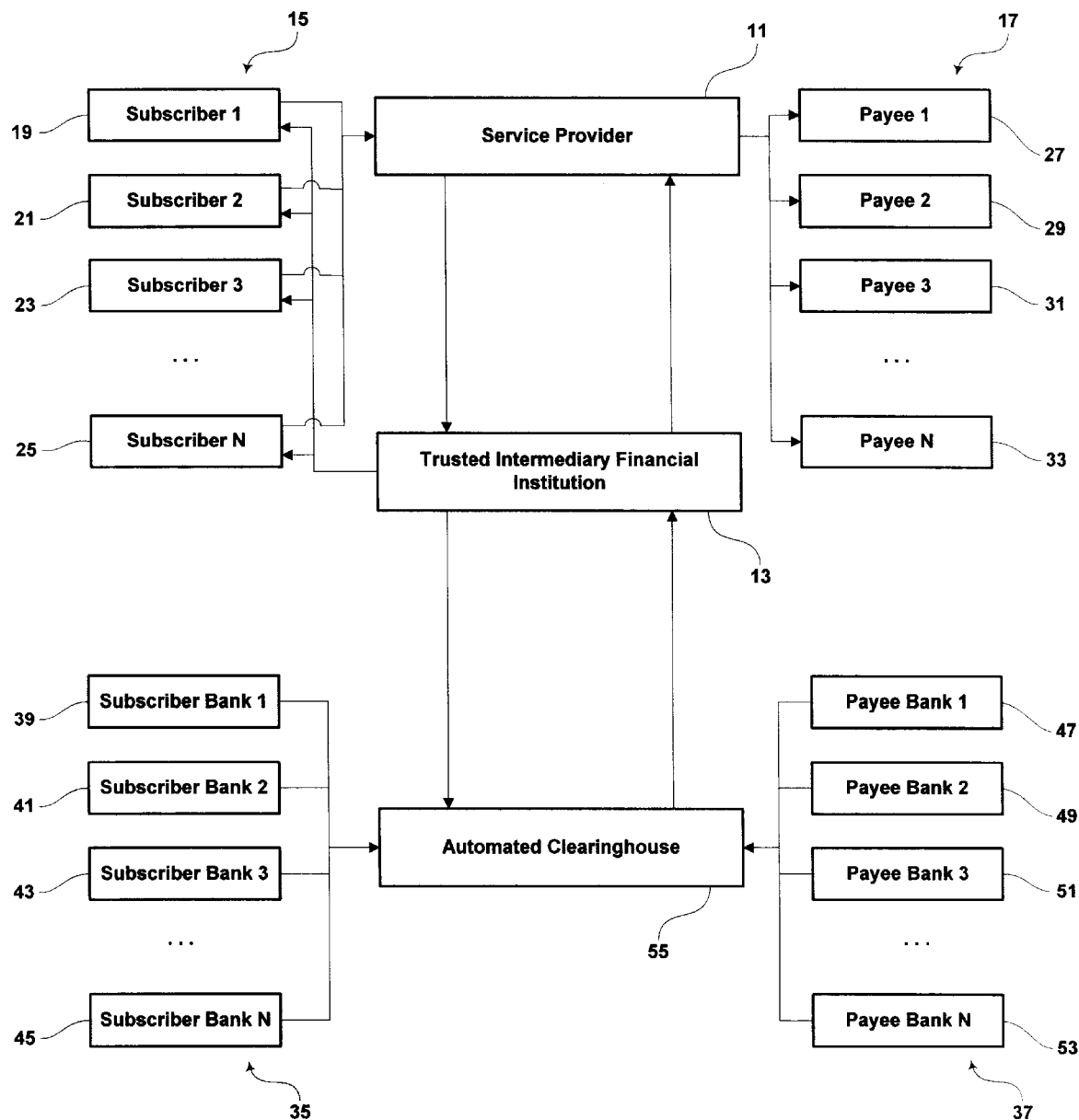
FIG. 1 is a schematic depiction of the improved payment system of the present invention.

FIG. 1 is a pictorial representation of an improved method and apparatus of making payments in accordance with the present invention. A plurality of payor entities 15 (including subscribers 19, 21, 23, and 25) have obligations to a plurality of payee entities 17 (including payees 27, 29, 31, and 33). In accordance with the present invention a service provider 11 operates to make those payments on behalf of the plurality of payor entities 15 to the plurality of payee entities 17. The activities of service provider 11 are coordinated with at least one trusted intermediary financial institution 13. In accordance with the present invention, service provider 11 obtains authorization from the plurality of payor entities 15, which allows the service provider 11 to make payments on behalf of the plurality of payor entities 15 to the plurality of payee entities 17. Preferably, service provider 11 generates negotiable instruments and directs them to the plurality of payee entities 17. The plurality of payee entities 17 utilize the payee banks 47, 49, 51, and 53 (collectively 37) to make a series of presentments of the negotiable instruments, in order to obtain payment. The negotiable instruments are typically routed for collection, for example, through automated clearing houses such as automated clearing house 55. Preferably, the negotiable instruments generated by service provider 11 are drawn on one or more accounts set up with trusted intermediary financial institution 13. Accordingly, those negotiable instruments are ultimately presented through automated clearing house 55 (and other automated clearing houses) to trusted intermediary financial institution 13, for payment. In accordance with the present invention, arrangements are made for the trusted intermediary financial institution 13 to periodically receive payment information and payment authorization from the plurality of payor entities 15. Additionally, the trusted intermediary financial institution 13 is authorized to automatically transfer funds to the service provider's 11 disbursement account in amounts consistent with the payment information and payment authorization (that is, not a greater or lesser amount).

Preferably, the payment information includes an identification of payment amounts for each of the plurality of payee entities 17, a payment record identifier (such as a "virtual check number") which is uniquely associated with each payment amount, and an authorization code which is associated with each payment identifier. The payment information may optionally include an identification of each of the plurality of payee entities 17. The authorization code can be a preestablished character string which is uniquely associated with each payment identifier, or it can be a character string generated by a random number generator or similar algorithm. The authorization code can serve as a password which allows secure verbal communication between the trusted intermediary financial institution(s) and the plurality of payor(s), since the trusted intermediary can request that a purported payor correctly identify the authorization code prior to revealing confidential information.

Also, in accordance with the present invention, payment instructions are periodically communicated from the plurality of payor entities 15 to service provider 11. The payment instructions include at least (1) an identification of each of the plurality of payee entities 17; (2) an identification of payment amounts for each of the plurality of payee entities 17; and (3) a payment record identifier uniquely associated with each payee entity.

In accordance with the present invention, the service provider 11 is utilized to (1) consolidate payment instructions from the plurality of payor entities 15; (2) direct a negotiable instrument to each of the plurality of payee entities 17; (3) generate payment verification information (such as, for example, "positive pay" information) for the negotiable instruments; and (4) communicate the payment verification information to the trusted intermediary financial institution 13. In accordance with the present invention, the payment verification information contains the information which is necessary to minimize the risk associated with altered or fraudulent negotiable instruments. In particular, at least the payment amount of a negotiable instrument is communicated from service provider 11 to trusted intermediary financial institution 13. When a negotiable instrument is ultimately presented to trusted intermediary financial institution 13, the trusted intermediary financial institution 13 may compare a negotiable instrument with the payment verification information in order to verify the payment amount. For each negotiable instrument, upon receipt thereof, trusted intermediary financial institution 13 is utilized to verify the request for payment and automatically transfer funds between accounts for the plurality of payor entities 15 and service provider 11, in amounts necessary to effect payment. Preferably, these automatic transfers are accomplished utilizing conventional electronic funds transfer technology or E.D.I.B.A.N.X. transfer technology which are hereinafter collectively referred to as "electronic fund transfer(s)". In this manner, the disbursement account or accounts of service provider 11 with trusted intermediary financial institution 13 need not be funded in any amount whatsoever. Upon presentation of the negotiable instrument (typically, the instrument is passed through one or more banks including payee banks 37 and automated clearing house 55, trusted intermediary financial institution can perform conventional and automatic electronic funds transfers or E.D.I.B.A.N.X. transfers, typically by batch process at predetermined time intervals, (once the request for payment is validated) in order to fund the transaction and allow payment.

Figure 2:
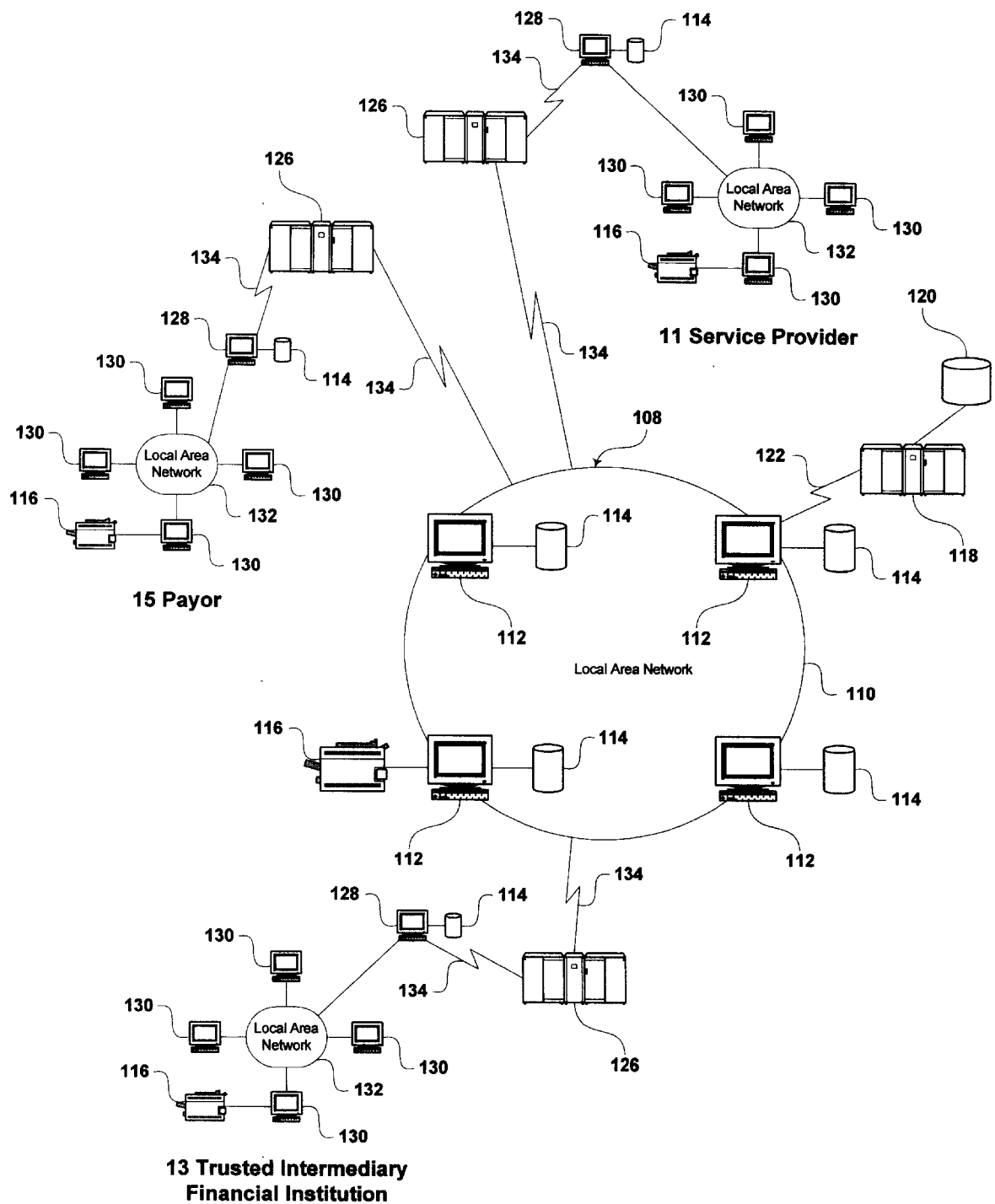
FIG. 2 is a schematic depiction of a distributed data processing system which may be utilized to effect the improved payment system of the present invention.
Figure 3:
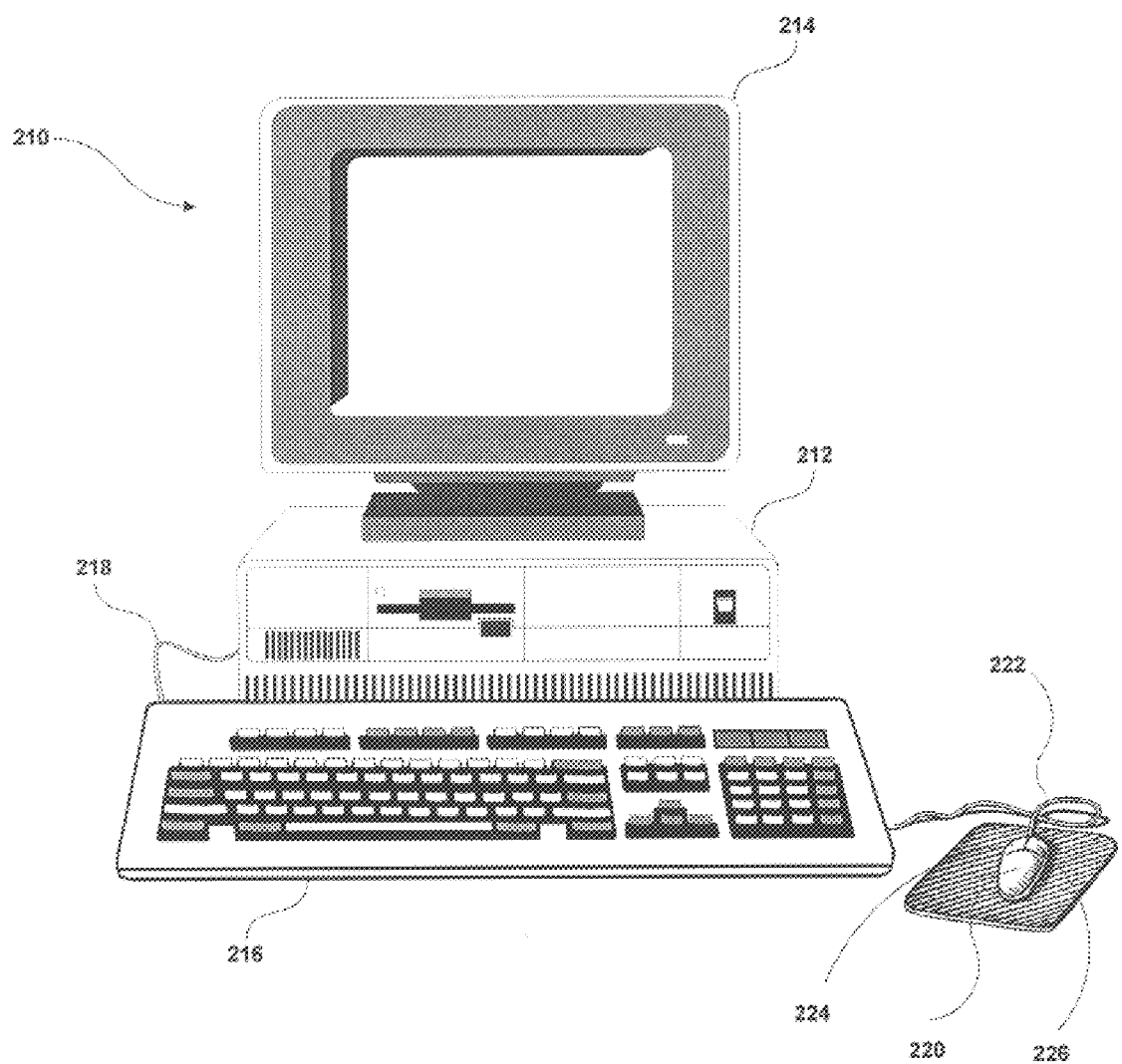
FIG. 3 is a pictorial representation of a data processing system which may be utilized to implement the improved payment system of the present invention.

In the preferred embodiment of the present invention, a distributed data processing system is utilized to perform many or all of the above identified functions. This greatly increases the speed and efficiency of operation and reduces the possibility of human error. A distributed data processing system is depicted in FIG. 2, and a personal computer is depicted in FIG. 3. The distributed data processing system and the personal computer can be utilized in accordance with the present invention to automate many or all of the significant operations of the improved method of making payments of the present invention.

With reference now to the figures and in particular with reference to FIG. 2, there is depicted a pictorial representation of a distributed data processing system 108 which may be utilized to implement the method and system of the present invention. As may be seen, distributed data processing system 108 may include a plurality of networks, such as Local Area Networks (LAN) 110 and 132, each of which preferably includes a plurality of individual computers 112 and 130, respectively. Of course, those skilled in the art will appreciate that a plurality of Intelligent Work Stations (IWS) coupled to a host processor may be utilized for each such network.

As is common in such data processing systems, each individual computer may be coupled to a storage device 114 and/or a printer/output device 116. One or more such storage devices 114 may be utilized, in accordance with the method of the present invention, to store the various data objects or documents which may be periodically accessed and processed by a user within distributed data processing system 108, in accordance with the method and system of the present invention. In a manner well known in the prior art, each such data processing procedure or document may be stored within a storage device 114 which is associated with a Resource Manager or Library Service, which is responsible for maintaining and updating all resource objects associated therewith.

Still referring to FIG. 2, it may be seen that distributed data processing system 108 may also include multiple mainframe computers, such as mainframe computer 118, which may be preferably coupled to Local Area Network (LAN) 110 by means of communications link 122. Mainframe computer 118 may also be coupled to a storage device 120 which may serve as remote storage for Local Area Network (LAN) 110. Other Local Area Networks (LAN) 132 may be coupled to Local Area Network (LAN) 110 via communications controllers 126 and communications links 134 to gateway servers 128. Gateway server 128 is preferably an individual computer or Intelligent Work Station (IWS) which serves to link Local Area Network (LAN) 132 to Local Area Network (LAN) 110.

As discussed above with respect to Local Area Network (LAN) 132 and Local Area Network (LAN) 110, a plurality of data processing procedures or documents may be stored within storage device 120 and controlled by mainframe computer 118, as Resource Manager or Library Service for the data processing procedures and documents thus stored.

Of course, those skilled in the art will appreciate that mainframe computer 118 may be located a great geographical distance from Local Area Network (LAN) 110 and similarly Local Area Network (LAN) 110 may be located a substantial distance from Local Area Network (LAN) 132. That is, Local Area Network (LAN) 132 may be located in California while Local Area Network (LAN) 110 may be located within Texas and mainframe computer 118 may be located in New York. In the view of FIG. 2, payor 15, service provider 11, and trusted intermediary financial institution 13 may be in possession and/or control of various local area networks, and in either continuous or intermittent communication with one another in order to accomplish the objectives of the present invention.

With reference to FIG. 3, there is depicted a pictorial representation of data processing system 210 which may be programmed in accordance with the present invention. As may be seen, data processing system 210 includes processor 212 which preferably includes a graphics processor, memory device and central processor (not shown). Coupled to processor 212 is video display 214 which may be implemented utilizing either a color or monochromatic monitor, in a manner well known in the art. Also coupled to processor 212 is keyboard 216. Keyboard 216 preferably comprises a standard computer keyboard which is coupled to the processor by means of cable 218.

Also coupled to processor 212 is a graphical pointing device, such as mouse 220. Mouse 220 is coupled to processor 212, in a manner well known in the art, via cable 222. As is shown, mouse 220 may include left button 224, and right button 226, each of which may be depressed, or "clicked", to provide command and control signals to data processing system 210. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 210 may be implemented utilizing a so-called personal computer.

Figure 4:
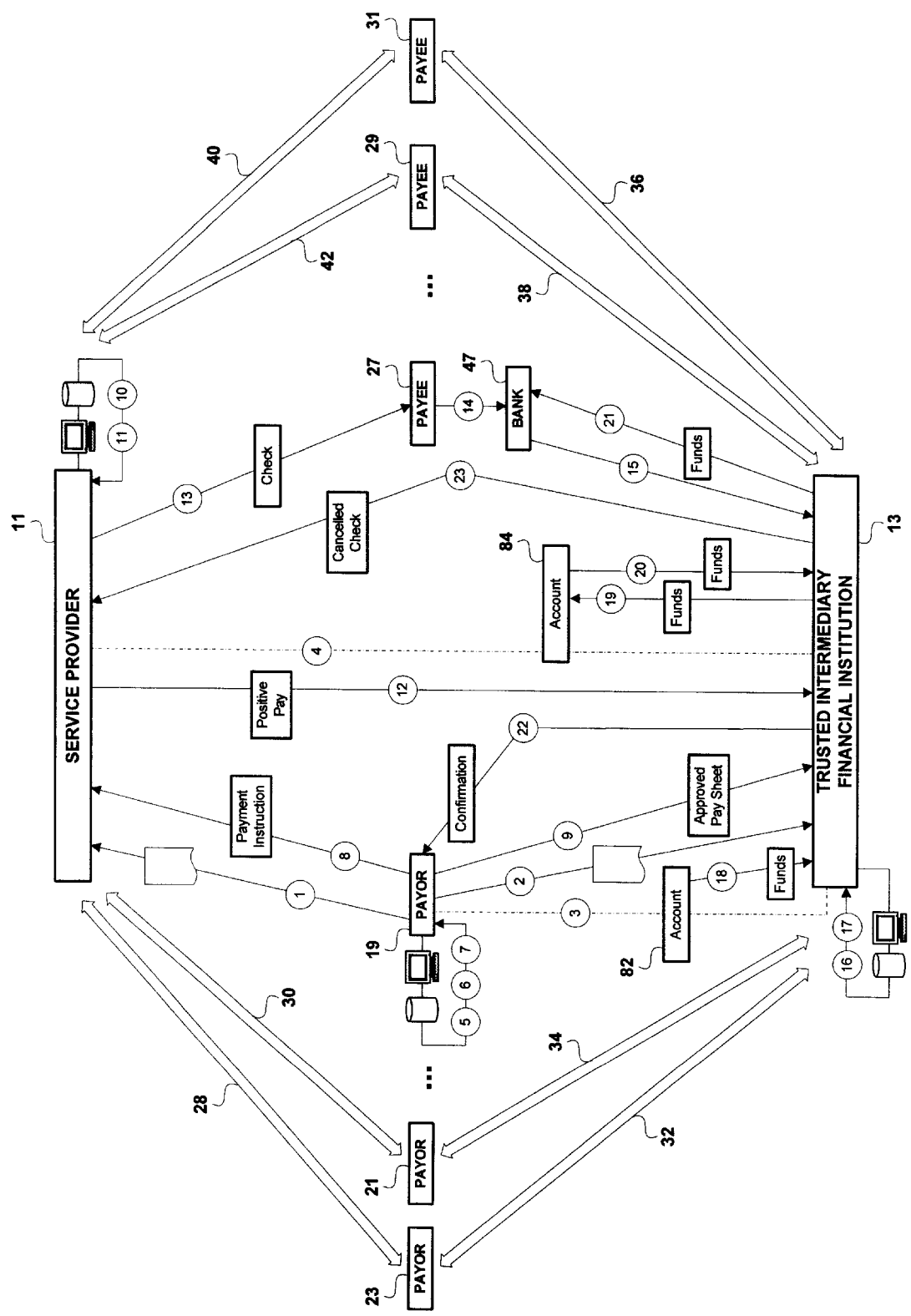
FIG. 4 is a pictorial representation in broad overview of the steps of the preferred improved payment system of the present invention.

FIG. 4 is a flow representation of the preferred method and apparatus of making payments, in accordance with a preferred embodiment of the present invention. As is shown, there is interaction between service provider 11, payors 19, 21, 23, trusted intermediary financial institution 13, and payees 27, 29, 31. Preferably, the interaction between service provider 11, payors 19, 21, 23, and trusted intermediary financial institution 13 is accomplished utilizing data processing implemented steps. Interaction between those entities and payees 27, 29, 31 may or may not be conducted utilizing data processing implemented steps. The flow of FIG. 4 provides considerable detail regarding the relationship between service provider 11, payor 19, trusted intermediary financial institution 13, and payee 27. Payors 21, 23, and payees 29, 31 have similar relationships which are represented generally by the flow arrows 28, 30, 32, 34, 36, 38, 40, and 42. The following textual discussion will deal exclusively with the relationship between payor 19, payee 27, service provider 11, and trusted intermediary financial institution 13. Where appropriate, the other relationships with the other payors and/or payees will be mentioned.

STEP ONE: In this step, payor 19 and service provider 11 enter into a contractual relationship regarding the payment of obligations by service provider 11 on behalf of payor 19 to a plurality of payee entities which is preferably communicated electronically between payor 19 and service provider 11, and which provides authorization to service provider 11 to perform the payment services which will be described below.

STEP TWO: In this step, payor 19 and trusted intermediary financial institution 13 enter into a contractual relationship which allows trusted intermediary financial institution 13 to withdraw and otherwise handle funds of payor 19 in a manner which is consistent with the contractual obligations between payor 19, trusted intermediary financial institution 13, and service provider 11.

STEP THREE: In this step, payor 19 establishes an account 82 with trusted intermediary financial institution 13 which will be utilized to pass funds to trusted intermediary financial institution 13 when pre-authorized requests for payment are received by trusted intermediary financial institution 13. In alternative embodiments, the trusted intermediary financial institution may comprise a trusted entity which directs and controls the actions of one or more banks for the purpose of effecting payment. In one particular alternative embodiment, no new account need be established; instead, electronic funds transfers from preexisting accounts are utilized to pass funds.

STEP FOUR: In this step, service provider 11 establishes an account 84 with trusted intermediary financial institution 13; preferably, such account would be contractually restricted to prevent the service provider from making withdrawals. This account will be managed in a coordinated manner with the account established by payor 19.

Figure 9:
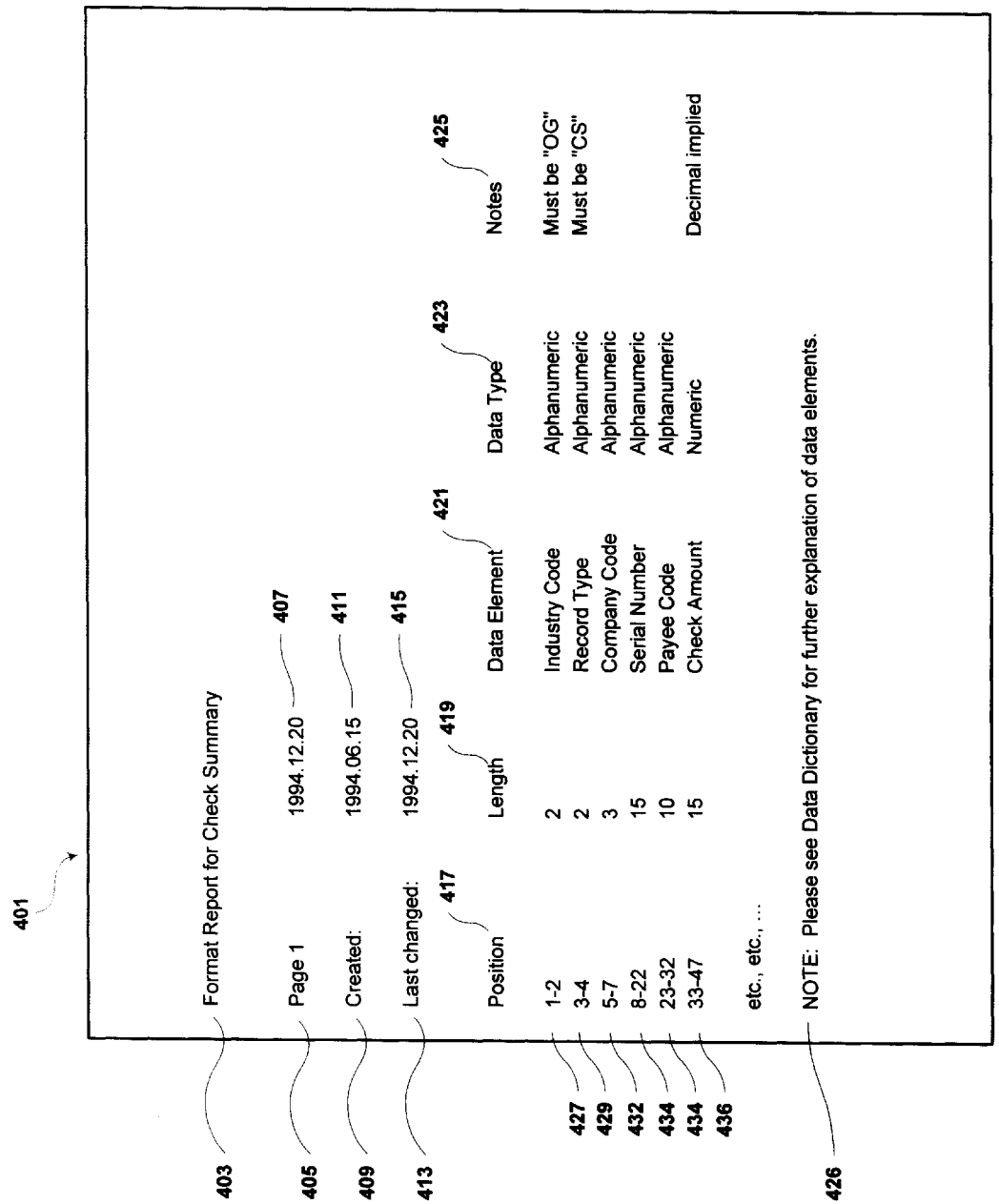
FIG. 9 is a pictorial representation of a format report for a check summary report, in accordance with one preferred embodiment of the present invention, which arranges payment information in a data block which facilitates the electronic communication of information from a particular payor entity to a service provider.
Figure 10:
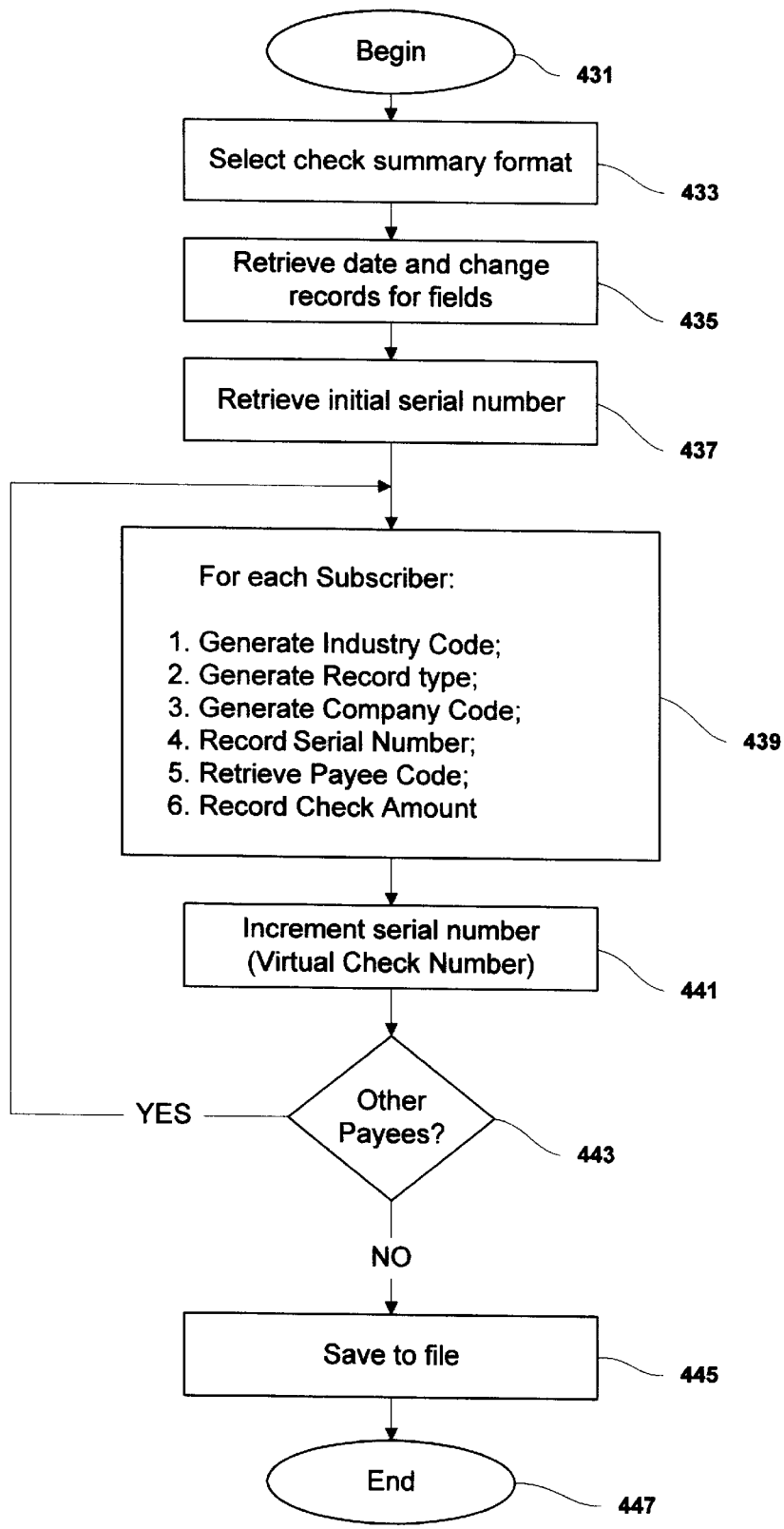
FIG. 10 is a flowchart representation of a data processing implemented generation of the data blocks for a check summary report in accordance with FIG. 9.
Figure 14:
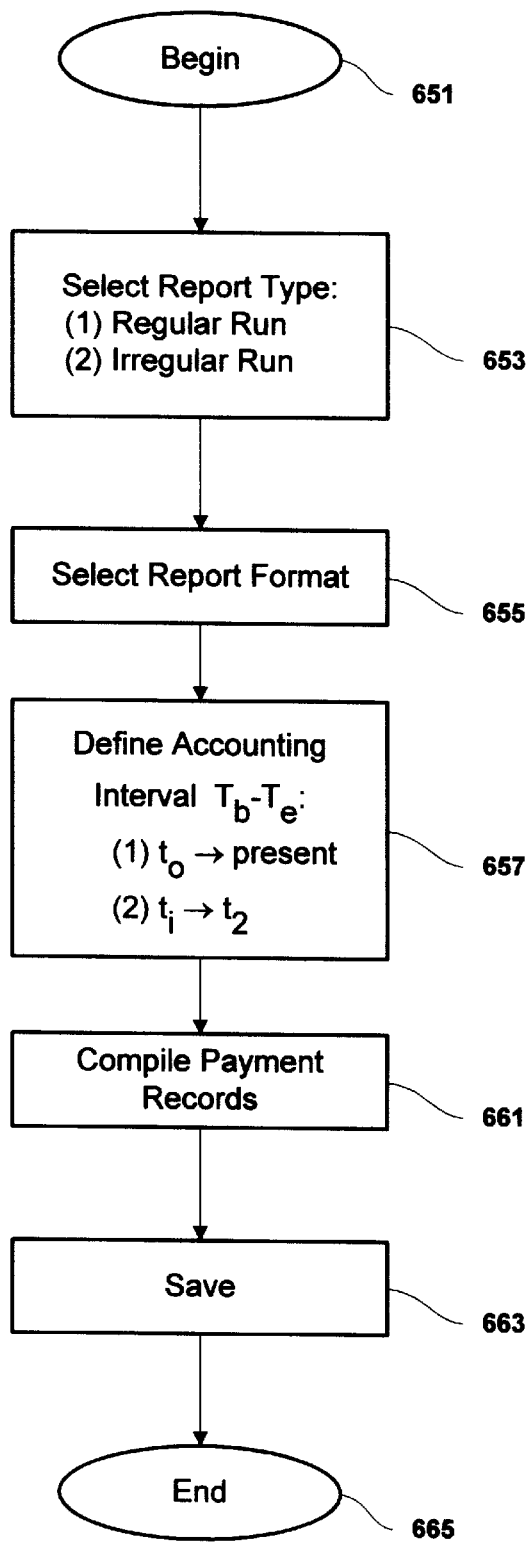
FIG. 14 is a flowchart representation of a data processing implemented compilation of payment obligation records.
Figure 15:
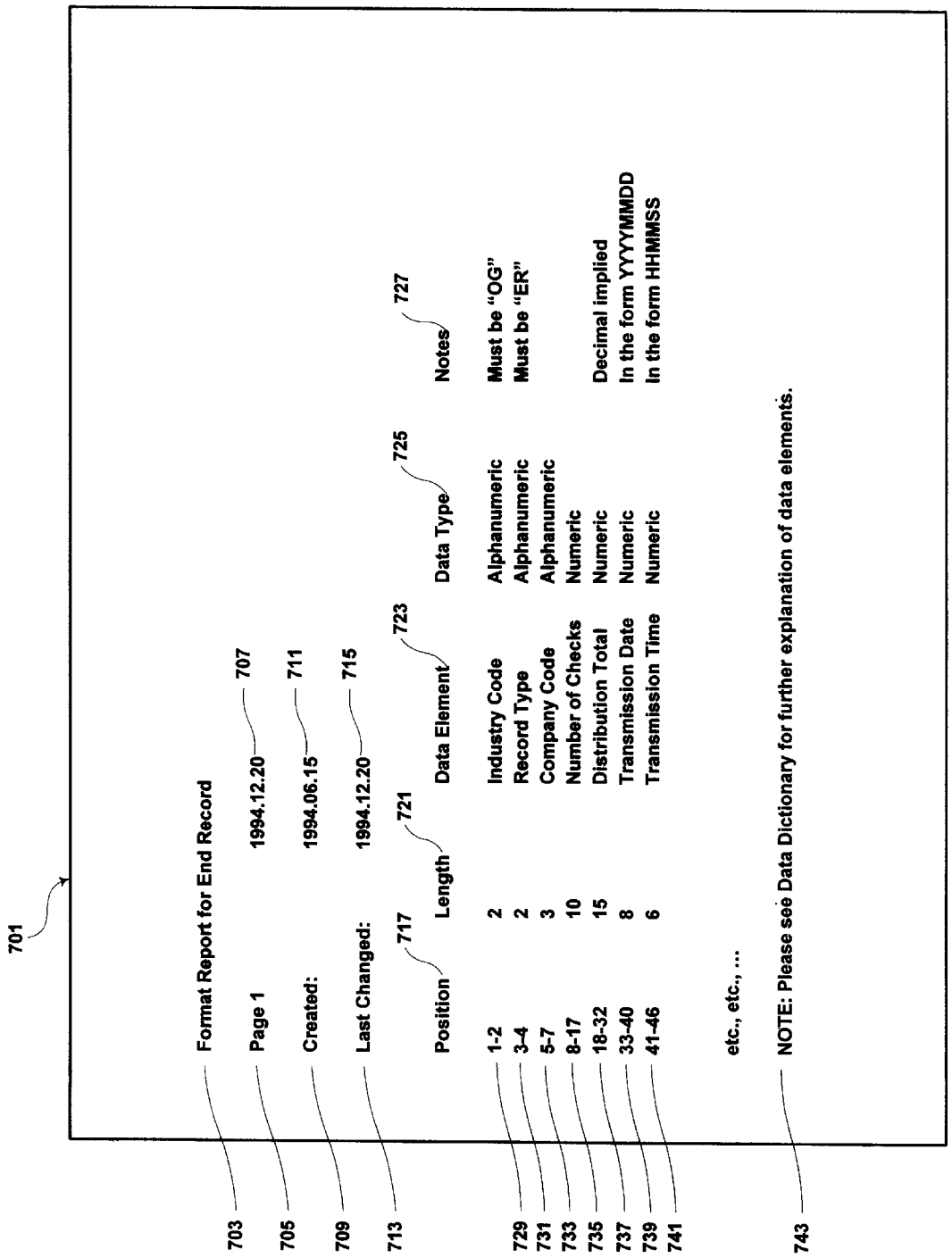
FIG. 15 is a pictorial representation of a format report for an end record report, which may be utilized for data communications integrity verification, in accordance with one particular embodiment of the present invention.

STEPS FIVE, SIX AND SEVEN: In Step Five, payor 19 reviews its internal accounting records by performing an automatic data processing implemented search in order to determine what payment obligations will be passed to service provider 11 and trusted intermediary financial institution 13 for satisfaction. FIG. 14 provides one example of a flowchart representation of a data processing implemented assembly of payment records. In Step Six, all the payments in the time interval of in question, the data processing system of payor 19 is then utilized to create a check summary. An example of the format utilized for a check summary is depicted in FIG. 9. FIG. 10 is a flowchart representation of a data processing implemented generation of a check summary. Each payment obligation will contain payment information which is maintained in a pre-selected data format. FIGS. 11, 12, and 13 provide format reports for the payment details which are characterized in those figures as a "check detail report." In Step Seven, payor 19 utilizes the data processing system to generate an end record report, which serves a "check sum" function. FIG. 15 is a picture representation of a format for a record report.

Figure 18:
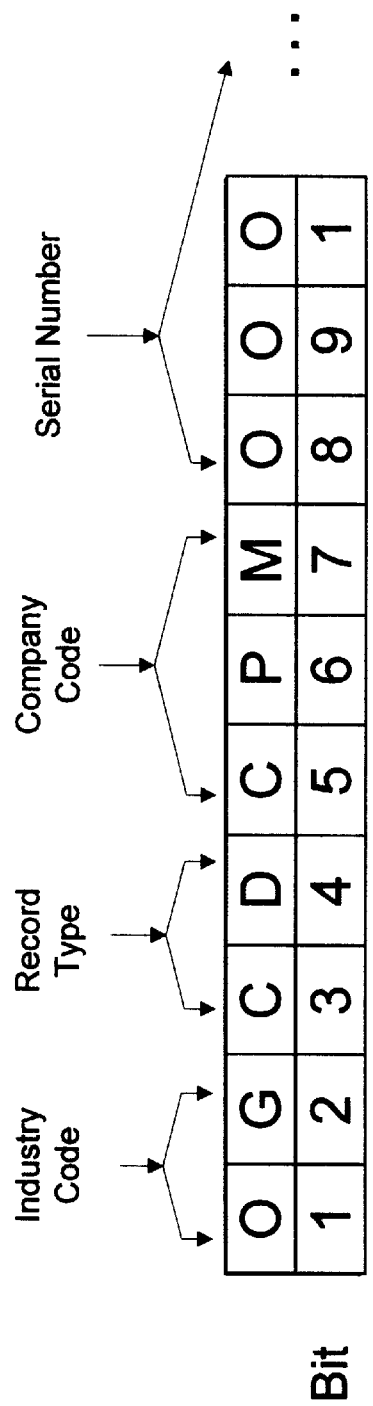
Figure 19:
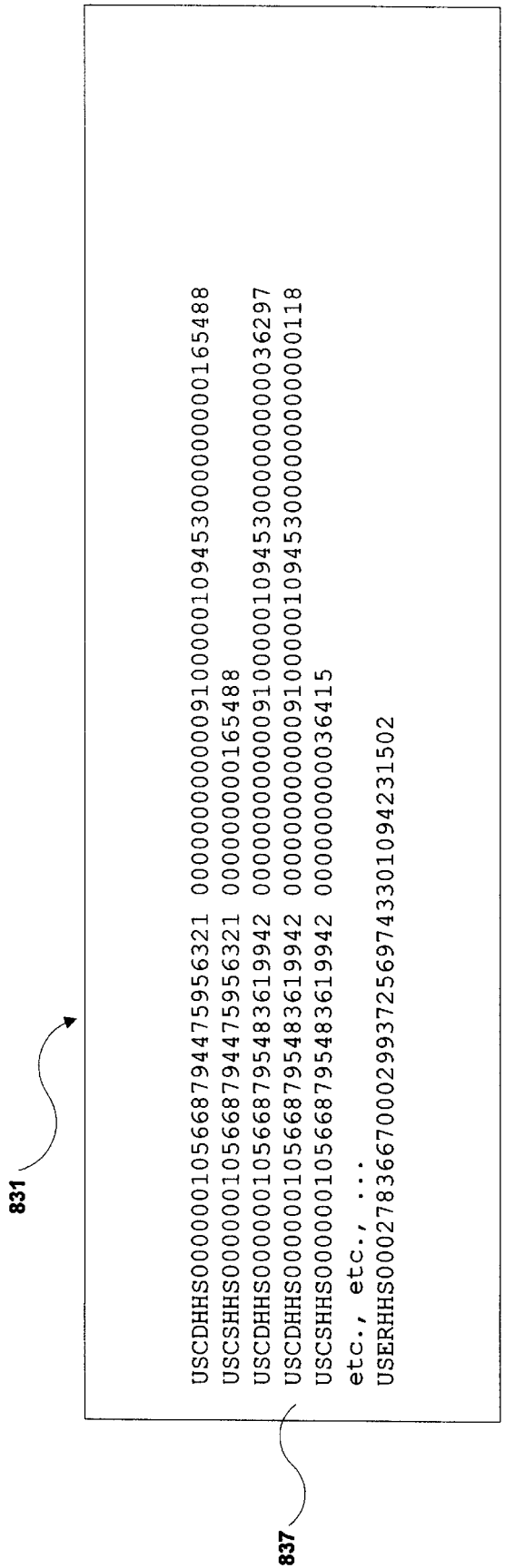
Figure 20:
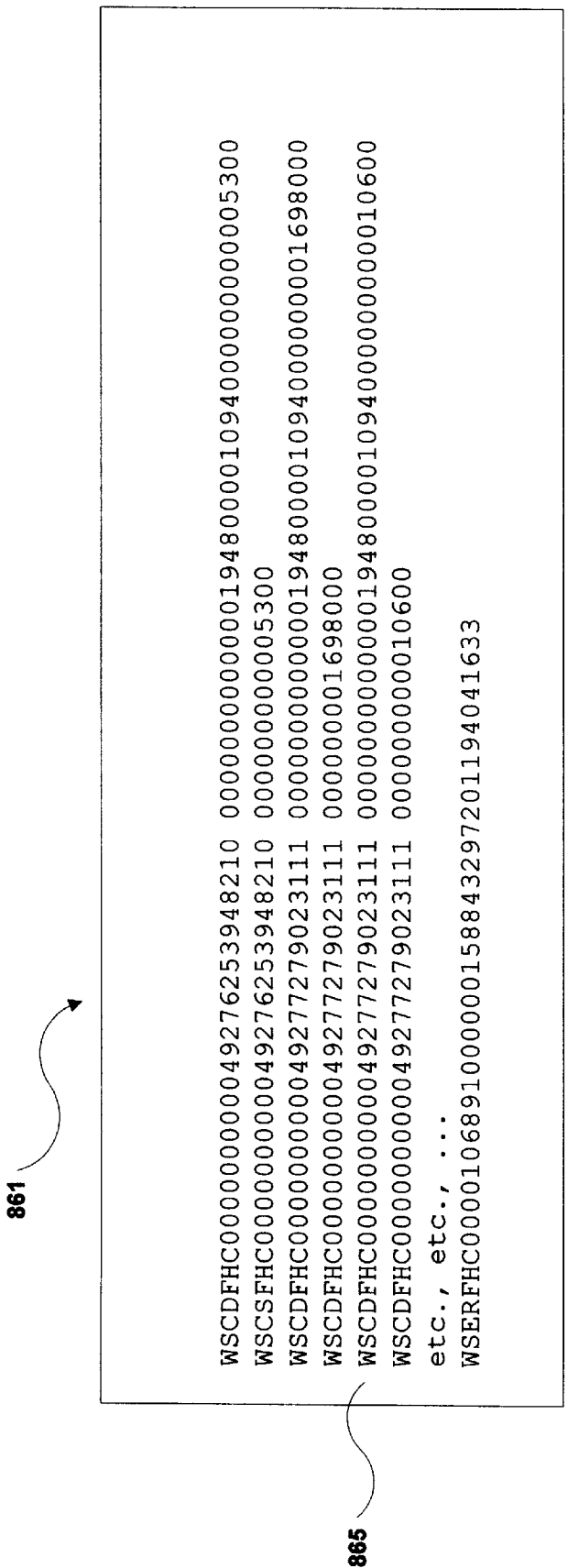

STEP EIGHT: In this step, payor 19 transmits payment instructions to service provider 11. In the preferred embodiment of the present invention, payor 19 and service provider 11 are either intermittently or continuously connected via distributed data processing system (or a simple modem or the like) in a manner which allows for the communication of the large blocks of highly formatted data. Where electronic communication over telephone lines, cellular telephone connections, satellite connections, or microwave connections is not possible, the payment instructions may be copied to magnetic tape and couriered or mailed from payor 19 to service provider 11. FIGS. 17, 18, 19, and 20 depict exemplary data transmissions. Note that the data is arranged utilizing the preselected formats, thus a large amount of data may be transmitted in relatively short, but extensively formatted, communications. FIG. 17 depicts an exemplary data transmission from an oil and gas company. FIG. 19 depicts an exemplary communication from a governmental agency. FIG. 20 depicts an exemplary communication from a publicly traded company. FIG. 18 relates the format of the data to particular bits in the data communication.

Figure 22:
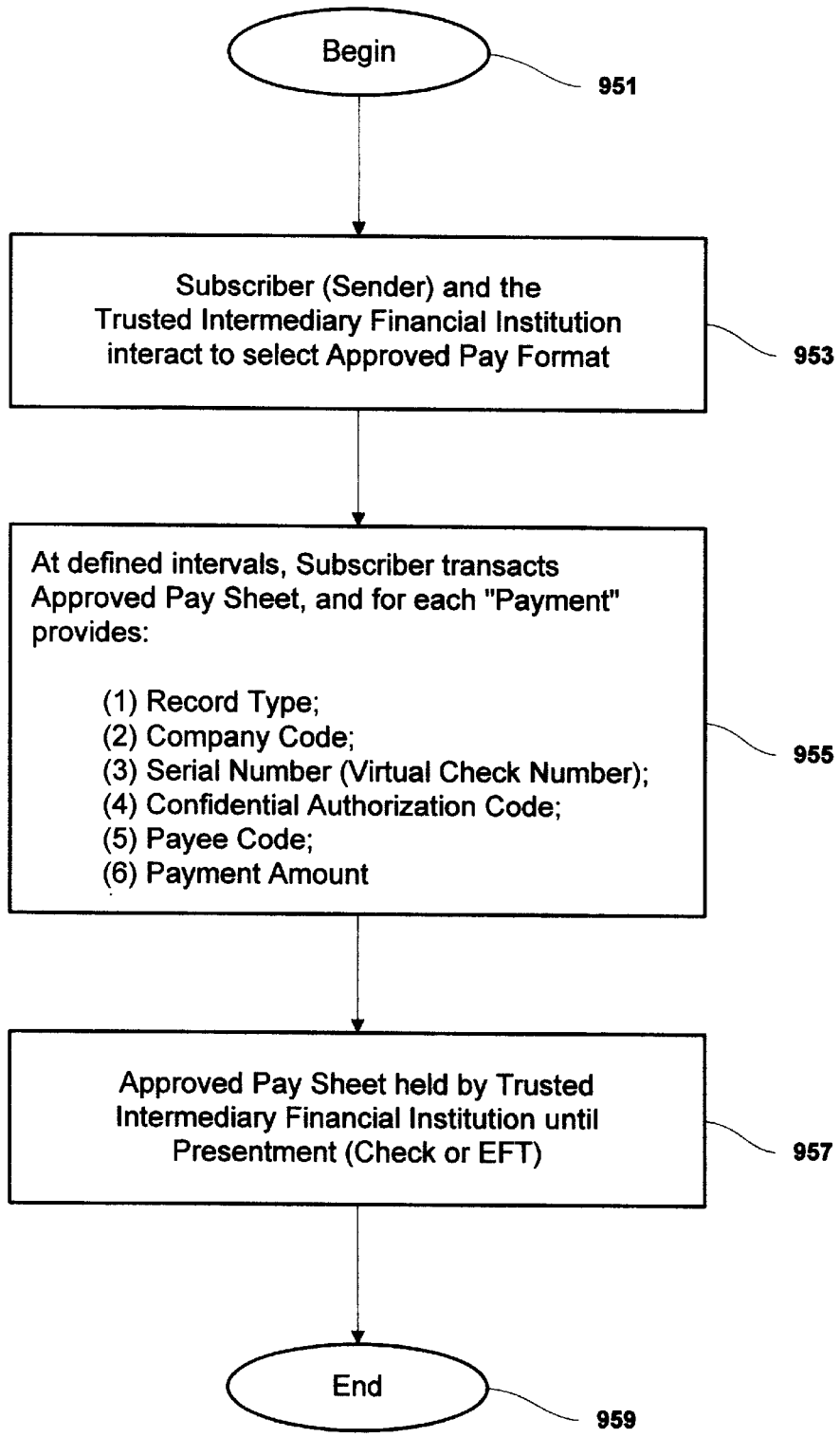
FIG. 22 is a flowchart representation of a data processing implemented generation and utilization of an approved pay sheet in accordance with FIG. 21.

STEP NINE: In this step, payor 19 communicates payment information substantially contemporaneously to trusted intermediary financial institution 13. In accordance with the present invention, the transmission is preferably communicated over a distributed data processing system, but may also be communicated utilizing a simple modem or the like. When telephone, cellular, satellite, or microwave communication is not possible, a magnetic tape may be couriered or mailed from payor 19 to trusted intermediary financial institution 13. Specifically, the information communicated by payor 19 to trusted intermediary financial institution 13 is an approved pay sheet. FIG. 21 is a picture representation of a report format for an approved pay sheet which is communicated by payor 19 to trusted intermediary financial institution 13. FIG. 22 is a flowchart depiction of data processing implemented steps of generating and utilizing the approved pay sheet information.

STEPS TEN AND ELEVEN: In these steps, service provider 11 receives payment instructions from a plurality of payors (such as payor 19, payor 21, payor 23). Service provider 11 utilizes its data processing system to sort the records of payment obligations in order to aggregate all of the payments due to a particular payee (such as payee 29) even though those obligations originate from different payors. In other words, service provider 11 may accumulate the payment obligations of dozens or hundreds of payors, and sort them in a manner which arranges the payment obligations by the identity of the payees. There may be thousands of payees. The payment information can be consolidated in this manner to obtain significant economies of scale and other business efficiencies which are not present when individual payors attempt to meet there individual payment obligations.

Figure 23A:
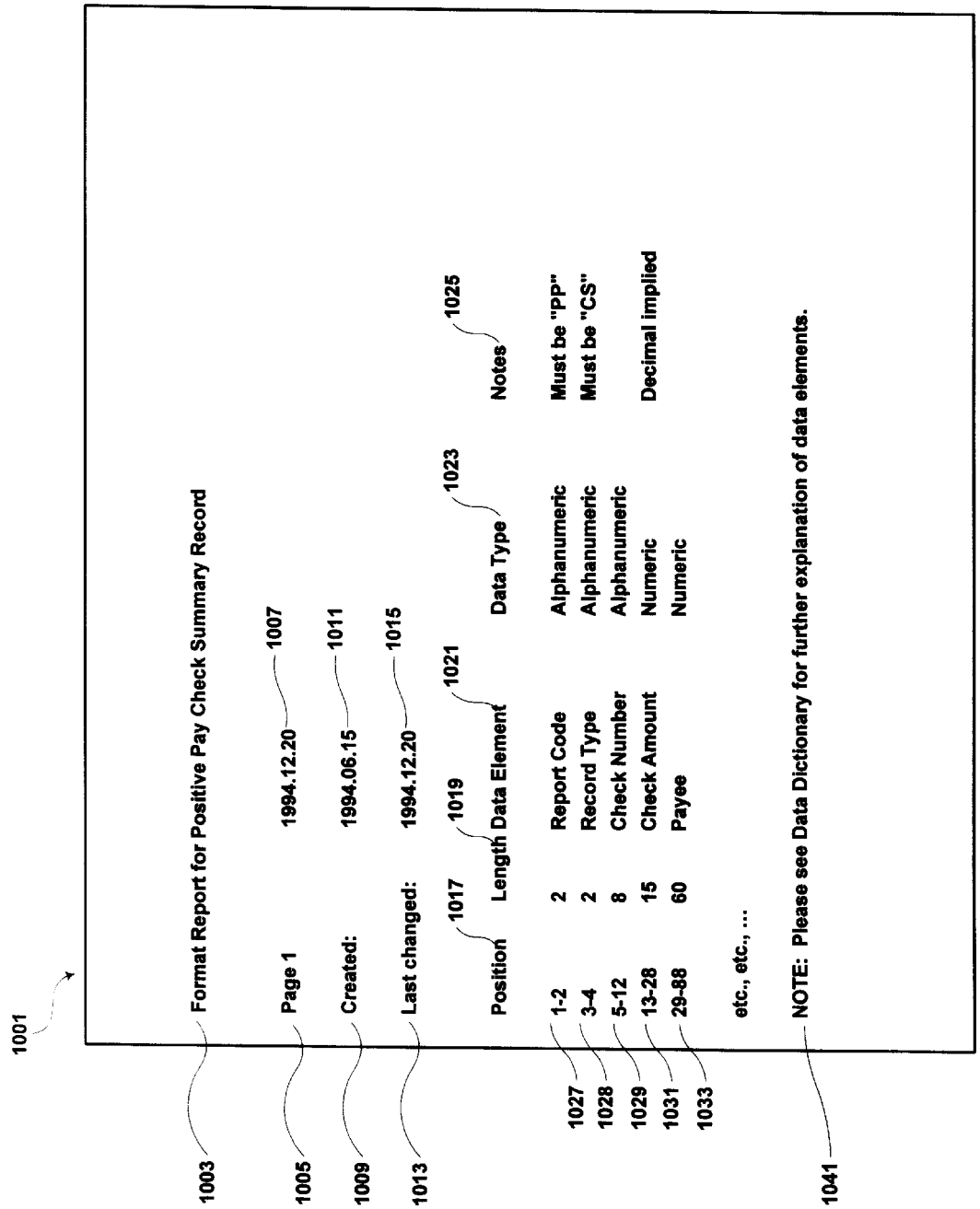

STEP TWELVE: In this step, service provider 11 generates a positive pay report which is directed to trusted intermediary financial institution 13, preferably electronically, utilizing either a distributed data processing system or intermittent connection like that available with conventional modems. If such intermittent or continuous electronic communication is not possible, a magnetic tape may be couriered or mailed from service provider 11 to trusted intermediary financial institution 13. FIG. 23 is a picture representation of a format report for the positive pay report. FIG. 24 is a flowchart representation of the data processing implemented steps of generating and utilizing a positive pay report.

STEP THIRTEEN: In this step, service provider 11 generates and communicates negotiable instruments (such as checks) to the plurality of payees, including payee 27. Each negotiable instrument or check includes a printed record of the payment obligations being satisfied by the single negotiable instrument. FIGS. 27, 28, and 29 provide examples of the types of check reports or "check stubs" which can be generated in accordance with the present invention, and which consolidate payment information from a variety of different payor entities, while simultaneously directing a negotiable instrument to a single payee, such as payee 27.

STEP FOURTEEN: In this step, payee 27 tenders the negotiable instrument received from serviced provider 11 to its bank 47.

STEP FIFTEEN: In this step, the bank 47 presents the negotiable instrument to trusted intermediary financial institution 13 in a conventional manner. This is typically accomplished utilizing automated clearing houses, which are not shown, to simplify the description.

STEPS SIXTEEN AND SEVENTEEN: In these steps, throughout a business day, trusted intermediary financial institution 13 utilizes its own data processing system to record and accumulate the presentations of negotiable instruments for payment. In Step Sixteen, the trusted intermediary financial institution 13 compares each presentment against the positive pay records provided by service provider 11. Then, utilizing the virtual check numbers, trusted intermediary financial institution 13 compares each portion of a negotiable instrument presented for payment with the approved pay sheets provided by the payors. Of course, a single negotiable instrument likely represents payment from a plurality of payors, and thus requires that the trusted intermediary financial institution be able to quickly and efficiently compare the virtual check numbers and amounts with all the approved pay sheets provided by the payor entities for the time interval in question. Once each negotiable instrument has been cleared with both the positive pay sheet and the approved pay sheets, the transaction is recorded in memory, in accordance with Step Seventeen, for reporting to the payors.

STEPS EIGHTEEN, NINETEEN, TWENTY, and TWENTY-ONE: In these steps, trusted intermediary financial institution 13 utilizes conventional electronic funds transfers or E.D.I.B.A.N.X. transfers in order to pull funds from the accounts of the payor entities (in accordance with Step Eighteen), and deposit funds in the disbursement account of service provider 11 (in accordance with Step Nineteen). As an alternative, funds may be transferred directly from the accounts of the payees, so that funds are never passed through the account of the service provider, thus maximizing security. The negotiable instruments are then honored by the trusted intermediary financial institution. In accordance with Step Twenty, the disbursement account of service provider 11 is debited by trusted intermediary financial institution for the appropriate amount necessary to cover the authorized payment. Then, in accordance with Step Twenty-One, trusted intermediary financial institution transfers funds to the payee's bank in a conventional manner, through a conventional automated clearing house. In accordance with the present invention, Steps Nineteen and Twenty occur substantially simultaneously. In this manner, service provider 11 has only momentary possession of the funds which are utilized to satisfy the payment obligations represented by many negotiable instruments which have been presented to trusted intermediary financial institution 13 throughout the course of a business day. In essence, the account of service provider 11 is a mere shell which allows for payment activities to push and pull funds to and from it in order to satisfy the payment obligations which have been cleared with both the positive pay sheet and the approved pay sheets.

STEP TWENTY-TWO: In this step, the data which has been recorded by the data processing system of trusted intermediary financial institution 13 is communicated (preferably electronically) to payor 19. The payors are then able to confirm that payments have been made. Additionally, the payors are in a position to answer questions from the payees concerning the payments.

FIGS. 5, 6, and 7 are pictorial representations of exemplary authorizations which may be obtained from the plurality of payor entities 15 by service provider 11, which allows service provider 11 to make payments on behalf of the plurality of payor entities 15 to a plurality of payee entities 17. FIG. 5 depicts an exemplary authorization for the oil and gas industry. FIG. 6 depicts an exemplary authorization for governmental entities. FIG. 7 depicts an exemplary authorization for dividend payments. The authorization pages of FIGS. 5, 6, and 7 may be generated as an electronic document in a particular data processing system, such as data processing system 210 of FIG. 3, and then may be communicated electronically through a distributed data processing system, such as that depicted in FIG. 2 from service provider 11 to a particular one of the plurality of payor entities 15 to service provider 11. The authorization document grants the authorization to make payments of a particular kind, in accordance with payment instructions which are provided by the payor entity. In the context of oil and gas revenue distribution, which is depicted in FIG. 5, the authorization document 311 includes a title 313, and a statement of purpose 315. Additionally, a textual authorization 317 is provided which authorizes the service provider 11 to make payments on behalf of a particular payor (Exxon Company, USA) in accordance with an approved pay sheet. The authorization document 311 includes a signature block 319, plus bank account information. If authorization document 311 is communicated electronically via a distributed data processing system, the signature portion and date portion of signature block 319 will include an electronic signature and a computer-generated time-and-date stamp, using conventional technologies.

The authorization document 321 of FIG. 6 pertains to the disbursement of funds from government entities, and may be particularly useful for the authorization of the disbursement of funds for entitlement programs. As is shown in FIG. 6, the authorization document 321 includes a title portion 313, a statement of purpose 315, a detailed authorization 317, plus bank account information, and a signature block 319.

FIG. 7 depicts the utilization of the present invention for the payment of corporate dividends on investment instruments such as stocks. Authorization document 23 includes title portion 313, a brief statement of purpose 315, a detailed authorization 317, plus bank account information and a signature block 319.

The approved pay sheet identified in the exemplary documents of FIGS. 5, 6, and 7 corresponds to the "payment instructions" which are communicated from a particular one of the plurality of payor entities 15 to the service provider 11. Preferably, such payment instructions include at least (1) an identification of each of the plurality of payee entities 17; (2) an identification of payment amounts for each of the plurality of payee entities; and (3) a payment record identifier which is uniquely associated with each payment amount and which essentially serves as a "virtual check number". Such payment instructions may be generated in an automated fashion at each particular payor entity utilizing a data processing system, such as data processing system 210 which is depicted in FIG. 3.

Figure 8:
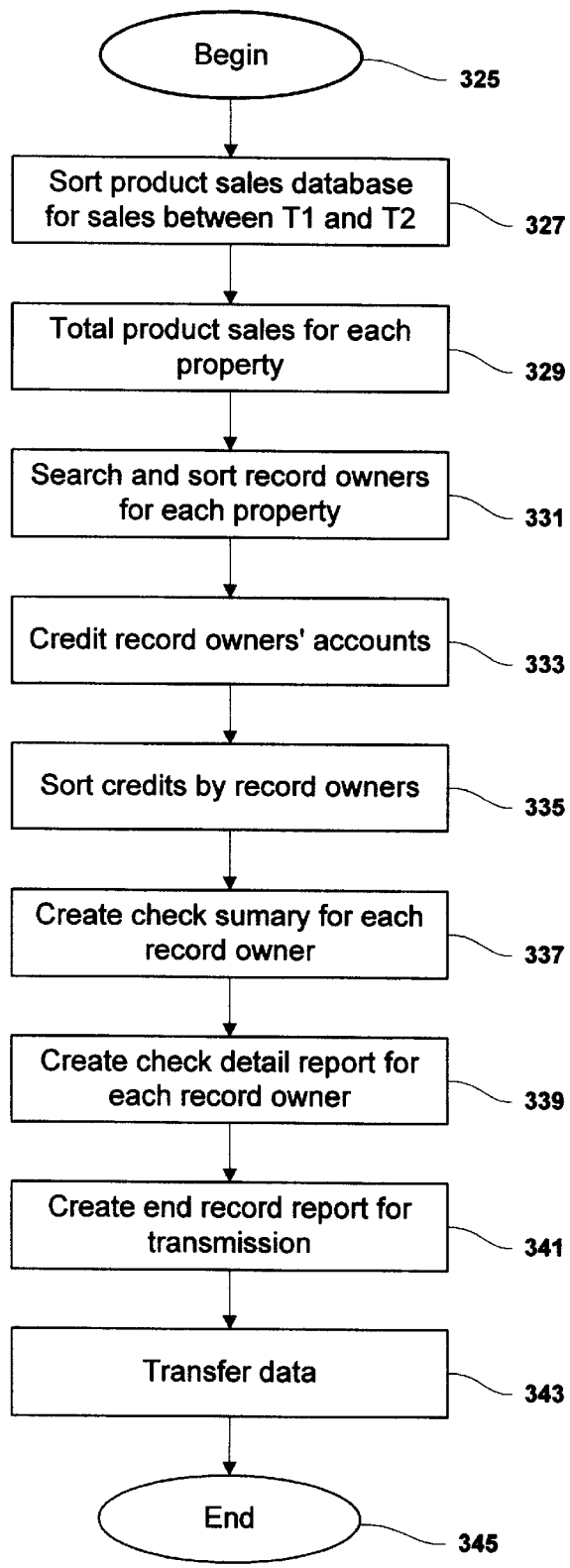
FIG. 8 is a flowchart representation of one technique for generating payment information for a particular one of a plurality of payor entities, in accordance with the improved payment system of the present invention, for oil and gas payment activities.

FIG. 8 is a flowchart representation of a computer program which may be utilized in assembling payment information for oil and gas revenue distribution, and provides one example of an automated technique for generating the payment information from a particular type of payor. In oil and gas revenue distribution, the payor entity is typically an oil and gas producing or purchasing company. This company has payment obligations to royalty and working interest owners in predetermined fractional amounts of the total revenue. The amounts due vary over time based upon: (1) the amount of oil and/or gas sold or purchased by the payor, (2) the prices obtained for the oil and/or gas products which were sold during a period of interest, and (3) the operating or marketing costs experienced by the payor. An automated technique for developing the payment information is depicted in FIG. 8. The process begins at software block 325, and continues at software block 327, wherein the product sales database is sorted for sales of oil and/or gas in a time interval between $T_1$ and $T_2$. Then, in accordance with software block 329, product sales for each property are totaled. Next, in accordance with software block 331, a data processing system is utilized to search and sort the record owners for each property. Typically, these record owners include royalty interest owners, overriding interest owners, and working interest owners. Then, in accordance with software block 333, the record owner's individual accounts are credited in an amount corresponding to the amount of oil and/or gas sold for the time interval in question. Then, in accordance with software block 335, the data processing system is utilized to sort the credits by record owners. Next, in accordance with software block 337, data processing system 210 is utilized to create a check detail for each record owner. FIG. 11 is a pictorial representation of an exemplary format for a check detail, in which the information necessary to identify the property or properties for which payment is being made is arranged in an efficient manner which allows for automated handling in accordance with the present invention. Returning now to FIG. 8, in accordance with software block 341, data processing system 210 is utilized to create an end record for the foregoing information. FIG. 15 is a pictorial representation of the data format for an end record. The end record summarizes payment information in a manner which allows the recipient of information to utilize the end record to perform a "check sum operation" or alternatively a "hash routine" upon the data transmission. For example, the end record of FIG. 15 includes an identification of the number of "checks" (that is, payment obligations) and the distribution total. The recipient of this electronic payment information can calculate a distribution total and a number of "checks" in order to verify the accuracy of the data transmission. Next, in accordance with software block 339, a check summary is created for each record owner. Preferably, the check summary includes the identifying information for each oil and/or gas property from which a payment is due. For example, a particular individual may be due payments for the sale of oil and/or gas from multiple properties for which the payor entity has payment obligation which are operated by the payor entity. Preferably, all of these amounts due are organized together in an efficient manner. FIG. 9 is a pictorial representation of a format report for an exemplary format for a check summary. The check summary formatted in accordance with FIG. 9 contains the essential information which allows a payor to communicate payment instructions to service provider 11.

Returning now to FIG. 8, data processing system 210 is utilized to transfer the data in accordance with software block 343, preferably utilizing the distributed data processing system depicted in FIG. 2. The process ends at software block 345 wherein service provider 11 has received and confirmed the accuracy of the payment information received from a particular one of the plurality of payor entities 15. Of course, service provider 11 will receive regular communications of payment information from all of the plurality of payor entities in a prearranged periodic fashion.

The data which is communicated from the plurality of payors 15 to service provider 11 is in the form of either an alphanumeric or a numeric block of data. FIG. 17 is a pictorial representation of a sample data transmission from Exxon Company, USA. The data communication 801 includes a data block 805. Within this data block 805, particular fields are dedicated for particular types of data, as will be explained in greater detail with reference to FIG. 17 and FIG. 18. FIG. 19 is a pictorial representation of a data communication 831 from a governmental entity payor to a service provider, and includes a data block 837. Likewise, a plurality of fields are defined within the data block and are dedicated to particular types of data. FIG. 20 is a pictorial representation of a data block from Ford Motor Company. Data communication 861 includes a data block 865. Likewise, this data block includes a plurality of fields which are dedicated for particular types of data.

With reference again to FIG. 8, the check summary for each payment in the payment instructions includes data which is arranged in accordance with the fields which are set forth in FIG. 9. The format report 401 of FIG. 9 includes a title section 403, a page field 405, a date field 407, date of creation fields 409, 411, and date of last change fields 413, 415. The check summary includes alphanumeric characters which represent particular information in accordance with the pre-defined convention.

The data block of the check summary report is defined by the table displayed in FIG. 9. Each data field can be defined by its position, length, and content in accordance with this tabular display. "Position" column 417 defines the position of the data fields, and "length" column 419 defines the length of the data fields. The "data element" column 421 defines the type of data contained within the field, and the "data type" column 423 defines whether the field is numeric or alphanumeric. The "notes" column 425 provides miscellaneous information relating to the field. As can be seen from this tabular display, the first data field is an "industry code" which is located in the first and second characters of the data block, and which has a field length of two characters. As can be seen from the "data type" column 423, these characters may be alphanumeric. Utilization of an industry code allows the service provider to service a variety of industries, yet maintain the data in a manner which can be searched easily by industry types. The next piece of information is a "record type" which is in the third and fourth character positions, and which is two characters long. As can be seen from FIG. 9, the "record type" typically will include alphanumeric data. The next piece of information is a "company code" which is kept in the fifth, sixth, and seventh character positions, and which is three characters in length. As can be seen from FIG. 9, the "company code" is an alphanumeric representation of a company.

The next piece of information is a "serial number" which is maintained in the eighth through twenty-second character position in the data block, and which is fifteen characters in length. As can be seen from FIG. 9, the "serial number" is alphanumeric. The "serial number" serves the same function as a "virtual check number". In other words, the serial number identifies a payment obligation which would have ordinarily resulted in the generation of a printed check which would have been mailed to a particular payee. Since the primary objective of the present invention is to consolidate payment obligations and to tender fewer, and better organized, payments, the serial number serves now to represent a payment obligation which will be, or which has been, satisfied, but which is not likely to be separately identifiable as a negotiable instrument. In other words, when multiple payment obligations are grouped together and a single negotiable instrument is generated, a plurality of serial numbers may be represented by the negotiable instrument.

The next piece of information contained in the check summary is a "payee code" which is located in character positions twenty-three through thirty-two, and which is ten characters in length. As can be seen from FIG. 9, the "payee code" is alphanumeric data. The "payee code" identifies the particular payee in a pre-defined manner. Preferably, a directory is established with "company codes" and "payee codes" mapped to a full identification of either a payor or a payee. The next piece of information in the data block is a "check amount" which is maintained in character positions thirty-three through forty-seven, and which is fifteen characters in length. The "check amount" will ordinarily be numeric data only. The check amount represents a payment obligation which would have ordinarily resulted in the generation of a negotiable instrument. In accordance with the present invention, this particular check amount may be grouped with other payment obligations and tendered to a particular payee in a single negotiable instrument. Like the "serial number" information, the "check amount" information allows the payor entity to maintain good and accurate internal records about the payment obligations and the satisfaction of those payment obligations. Other types of fields containing other types of information may be included in the check summary. The exemplary check summary of FIG. 9 provides some of the most basic and essential components of the payment information. FIG. 26 is a data dictionary which more carefully defines the meaning and content of the data elements of the check summary (and other) reports.

FIG. 10 is a flow chart depiction of a data processing implemented generation of a check summary. The process begins at software block 431 and continues as at software block 433, wherein a particular check summary format is selected. It is important to bear in mind that the check summary depicted in FIG. 9 is merely exemplary, and that other types of check summary reports could be utilized to convey the essential information necessary for a payment instruction. Next, in accordance with software block 435, the date and change records are retrieved to allow proper dating and version control of the electronic documents created in accordance with this technique. Then, in accordance with software block 437, an initial serial number is retrieved. This serial number represents the "virtual check number" which is associated with each payment obligation which is communicated from a particular payor to the service provider. Next, in accordance with software block 439, the data processing system is utilized to perform the following operations for each subscriber or payor:

1. generate an industry code for the payor;
2. generate a record type for the record;
3. generate or retrieve the company code which identifies the payor;
4. load or record the serial number to the serial number field (this corresponds to the virtual check number);
5. retrieve the payee code (which is preferably, but not necessarily, at least a tax identification number) which identifies the particular payee associated with the particular payment obligation; and
6. record the check amount to the check amount field.

In accordance with step 441, the serial number (or virtual check number) is incremented. Next, in accordance with software block 443, the data processing system determines if there are other payees that have not yet been processed. If so, the process returns to software block 439; if not, the process continues as software block 445, wherein the data is saved to a file. The data that is saved is a highly condensed record of the information necessary to make the payments. In this format, the information can be communicated efficiently, quickly, and at a low cost from the payor entities to the service provider. Since the information is maintained in dedicated fields, instruction operations are greatly facilitated, and the service provider can efficiently organize and manipulate data in a manner which facilitates its internal operations. For example, the service provider may be a "virtual entity" with facilities distributed in a variety of geographic locations. The data processing and check printing operations can be performed at a number of locations in a coordinated manner to allow the service provider to avail itself of low cost operations in rural or remotely located regions.

FIGS. 11, 12, and 13 are pictorial representations of a format report which is suitable for generating a check detail for oil and gas revenue distributions, government agency distributions, and stock dividend distributions, respectively. These formats define blocks of data which can be rapidly and easily transmitted via telephone lines or a distributed data processing system. Alternatively, the blocks of data can be recorded to a magnetic or optical memory media and physically transported.

Referring first to FIG. 11, the format report 501 includes a title field 503, page and date fields 505, 507, creation fields 509, 511, and change record fields 513, 515. The format report 501 includes a tabular display of data elements and includes information about the relative position of the data elements, the lengths of the data elements, the content of the data elements, the types of characters present in particular fields, and miscellaneous notes. This information is organized in column form in format report 501. The columns include a "position" column 517, a "length" column 519, a "data element" column 521, a "data type" column 523, and a "notes" column 525. Position column 517 defines the position of the data fields, and the length column 519 defines the length of the data fields. The data element column 521 defines the type of data contained within the field, and the data type column 523 defines whether the field is numeric or alphanumeric. The notes column 525 provides miscellaneous information relating to the field.

As can be seen from this tabular display, data field 529 is an "industry code" field which is two characters of alphanumeric data in the first and second field position which identifies the particular industry. As identified in the notes column 525, for oil and gas revenue distributions, this industry code is "OG". Data element 531 is a "record type" data element which is two characters long, and which occupies the third and fourth character positions in the data block. The data is alphanumeric. For oil and gas revenue distributions, the record type must be identified as "CD". Data element 533 is a "company code" which is three characters long and which occupies character positions 5–7. The company code is preferably alphanumeric. Data element 535 is a "serial number" which identifies the payment obligation, and which is fifteen characters in length and which occupies character positions 8–22 in the data block. Data element 537 is a "payee code" which occupies the ten characters in positions 23–32. Data element 539 is a "property code" which occupies the fifteen characters in the data block in positions 33–47. The data element 541 is a "sales start date" which occupies the four characters in positions 48–51. Data element 543 is a "sales end date" which occupies the four characters in positions 52–55. Data element 545 is a "product code" which occupies the two characters 56–57. Data element 547 is a "transaction code" which occupies the two characters in positions 58–59. Data element 549 is a "owner decimal" which occupies the ten characters in positions 6069. Data element 551 is an "interest type" which occupies two characters in positions 70–71. Data element 553 is a "detail amount" which occupies fifteen characters in positions 72–86.

FIG. 12 depicts a format report 557 for a check detail for utilization in the satisfaction of government agency obligations. Format report 557 includes title field 559, page and date fields 561, 563, date of creation fields 565, 567, and, change record fields 569, 571. As is shown, position column 573, length column 575, data element column 577, data type 579, and notes column 581 are provided to display in tabular form a format which may be utilized to rapidly and easily transmit details necessary for the satisfaction of governmental agency obligations. As is shown, data element 585 is dedicated to identify an industry code. For federal governmental distributions, the alphanumeric designators "US" must be utilized. Data element 587 is dedicated to identify a record type. Data element 589 is dedicated for identification of an agency code. The agency code may be an alphanumeric designation of a governmental agency. Data element 591 is dedicated to identify a serial number for the transaction. Data element 593 is dedicated to identify a payee code. Data element 595 is dedicated to identify a reference code. Data element 597 is dedicated to identify a payment start date. Data element 599 is dedicated to identify a payment in date. Data element 601 is dedicated to identify the transaction. Data element 603 is dedicated to identify a detail amount.

FIG. 13 is a pictorial representation of format report 605 for a check detail for utilization in stock dividend distributions. Format report 605 includes title field 607, page and date fields 609, 611, date of creation fields 613, 615, change record fields 617, 619. Additionally, format report 605 includes position column 621, length column 623, and data element column 625, data type column 627, and notes column 629. Data element 631 identifies an industry code. For stock dividend distributions, an alphanumeric character of "WS" may be utilized to identify "wallstreet" transactions. Data element 533 identifies a record type. Data element 535 identifies a company code. Data element 537 identifies a serial number which corresponds to the payment obligation, which would have ordinarily resulted in the generation of a printed check. Data element 639 identifies a payee code. Data element 641 identifies a reference code. Data element 643 identifies start date. Data element 645 identifies an end date. Data element 647 identifies detail amount. It is important to bear in mind that the check detail depicted in FIG. 9 is merely exemplary, and that other types of check summary reports could be utilized to convey the essential information necessary for a payment instruction.

FIG. 14 is a flowchart representation of a computer program utilized to generate data for the check detail in accordance with the format reports 501, 557, or 605 of FIGS. 11, 12, and 13. The process commences at software block 651, and continues at software block 653, wherein the computer program prompts the operator to select either a regular run or an irregular run. In the context of the present invention, a regular run constitutes the usual and customary accounting interval. For example, for governmental agency distributions, the customary accounting period may be calendar months, while for stock dividend distributions, the regular accounting period may constitute financial quarters, which may or may not coincide with calendar quarters. In accordance with the present invention, the operator is allowed to initiate payments in cycles other than the usual customary cycles by selecting the "irregular run" option in step 653. Next, in accordance with software block 655, the operator is prompted to select a particular report format. Then, in accordance with software block 657, the operator is prompted to define the accounting interval question from a beginning time point TB to an ending time point TE. Then, in accordance with software block 661, the data processing system compiles payment records for the selected accounting interval, and saves those payment records in accordance with software block 663. The process ends at software block 665.

FIGS. 17, 18, 19, and 20 depict and describe sample data transmissions which include the data blocks generated in accordance with the format reports of FIGS. 11, 12, and 13, as well as the flowchart representation of the computer software implemented to generation of the data blocks of FIG. 14. FIG. 17 is a sample data transmission 801 from Exxon Company, USA for oil and gas revenue distributions. FIG. 18 provides a detail view of the first ten bits in the sample data transmission of FIG. 17. As is shown, bits 1 and 2 are dedicated for the industry code. Since this is an oil and gas distribution, the industry code is "OG". Bits 3 and 4 are dedicated to identify the record type. In this particular instance, the record type "CD" indicates that the data transmitted in this line are check detail data. Bits 5, 6, and 7 are dedicated to identify the company code. As is shown, the letters "XON" are utilized to identify "Exxon Company, USA". Bits 8, 9, and 10 are the first three bits of a serial number which is utilized to identify the payment transaction to be made on behalf of Exxon Company, USA through the collaborative efforts of a service provider 11 and a trusted intermediary financial institution 13.

FIG. 19 is a sample data transmission 831 from the United States Department of Health and Human Services. As is shown, sample data transmission 831 includes a data block 837 which identifies the payments to be made by the coordinated efforts of service provider 11 and trusted intermediary financial institution 13 on behalf of the Department of Human Services. FIG. 20 is a sample data transmission 861 from Ford Motor Company. A data block 865 is defined by the format report 605 of FIG. 13 for stock dividend distributions as well as the software of FIG. 14.

In accordance with the present invention, each of the data blocks is concluded by an end record report which can be utilized in the manner of a "check sum" to verify the accuracy of the transmission. FIG. 15 is a pictorial representation of a format report 701 for an end record, which may be utilized in oil and gas revenue distributions, governmental and entitlements distributions, or stock dividend distributions. As is shown in FIG. 15, the format report 701 includes a title field 703, page and date fields 705, 707, a date of creation fields 709, 711, and change record fields 713, 715. As is shown, the data elements which make up an end record are defined by the tabular display of format report 701. The table includes position column 717, length column 721, data element column 723, data type column 725, and notes column 727. Data element 727 is a two-bit alphanumeric industry code. Data element 731 is a two-bit alphanumeric record type. Data element 731 is a three-bit alphanumeric company code. Data element 733 is a ten-bit numeric indicator of the total number of "checks" represented by the data transmission. In other words, data element 733 identifies the total number of payment obligations which would be satisfied by payment in accordance with the instructions contained within the data block. Data element 735 is a fifteen-bit numeric total of the distribution total of all the payments identified and authorized by the transmission. Data element 737 is a six-bit numeric transmission date. Data element 739 is a six-bit numeric transmission time.

Figure 16:
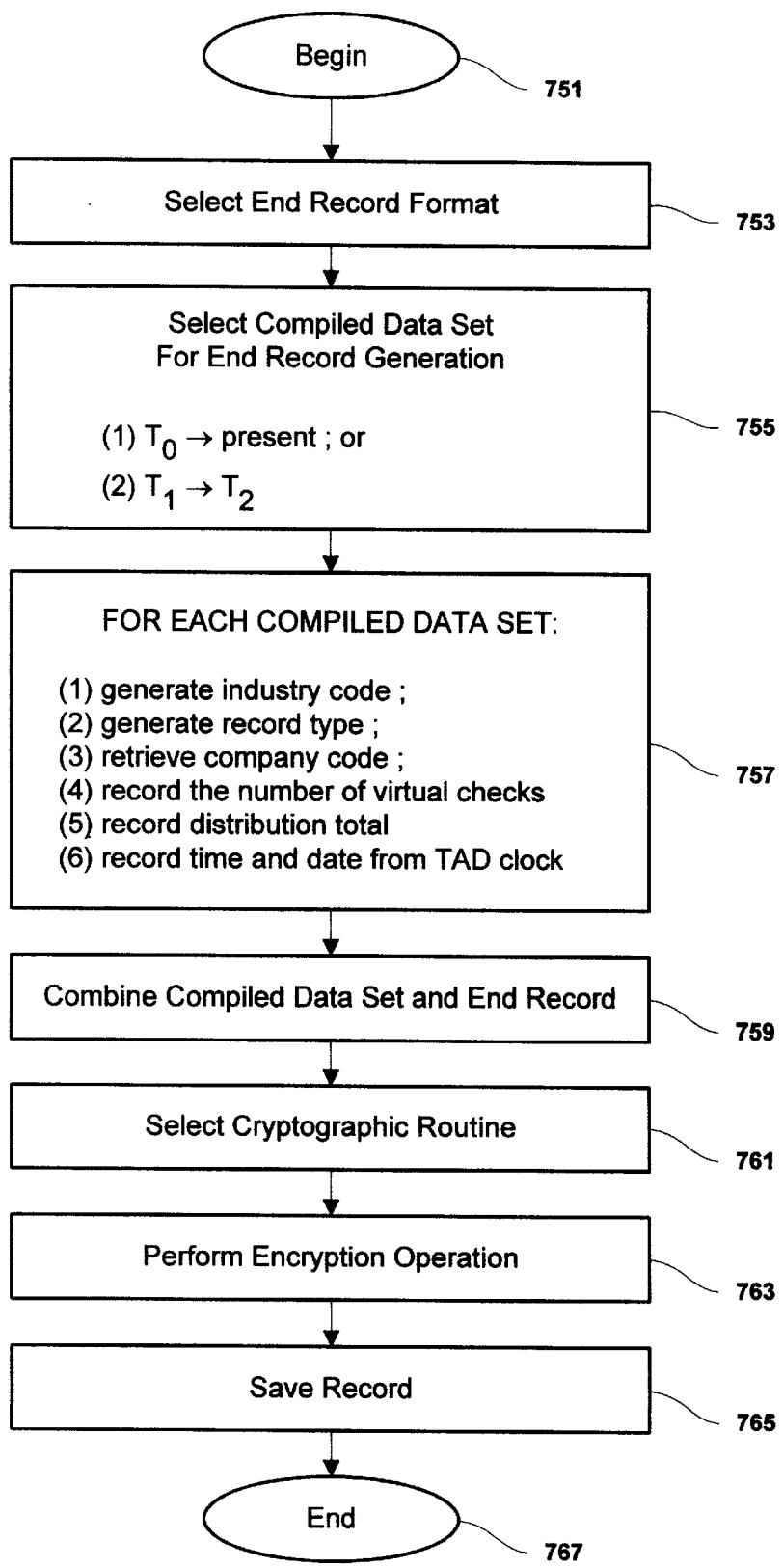
FIG. 16 is a flowchart representation of a data processing implementation of the automatic generation of an end record report in accordance with FIG. 15.

FIG. 16 is a flowchart representation of the software utilized to generate an end record like that defined by the format report 701 of FIG. 15. The process begins at software block 751, and continues at software block 753, wherein a particular end record format is selected by an operator; however, in alternative embodiments, this may not be explicitly or interactively selected. Then, in step 755, a compiled data set is selected for end record generation. Then, in accordance with software block 757, for each compiled data set, an industry code is generated, a record type is generated, a company code is retrieved, the number of "virtual checks" (that is, payment obligations) is recorded, the numeric total of the payment obligations is calculated and recorded, and the time and date are recorded from a time-and-date clock resident in the data processing system. Then, in accordance with software block 759, the compiled data set is combined with the end record. Preferably, in accordance with software block 761 a cryptographic routine is selected, and, in accordance with software block 763, is performed upon the compiled data set and end record. Then, in accordance with software block 765, the encrypted record is recorded, and the software routine ends at software block 767.

In accordance with the present invention, the plurality of payor entities 15 (of FIG. 1) provide to the trusted intermediary financial institution 13 a report which identifies approved payments. This document or electronic communication may be characterized as an "approved pay sheet", and includes an authorization code which authorizes the trusted intermediary financial institution 13 to honor negotiable instruments or initiate electronic fund transfers. FIG. 21 is a pictorial representation of a format report 901 for an approved pay sheet which is communicated by any particular one of the plurality of payor entities 15 to the trusted intermediary financial institution 13. As is shown, the format report includes title field 903, page and date fields 905, 907, date of creation fields 909, 911, and change record fields 913, 915. The data elements contained in the approved pay communication are defined with respect to the table set forth in format report 901, and in particular with reference to the following columns: position column 917, length column 919, data element column 921, data type column 923, and notes column 924. Data element 927 is a two-bit alphanumeric industry code. Data element 927 is a two-bit alphanumeric record type. Utilization of the code "AP" identifies this record as an approved pay record. Data element 929 is a three-bit alphanumeric company code which identifies the company making the payment. Data element 931 is a fifteen-bit alphanumeric serial number which identifies the payment or payments being made on behalf of the company. Data element 933 is a fifteen-bit alphanumeric authorization code which is known only by the payor entity and the trusted intermediary financial institution, and which is not known by the service provider. Data element 935 is a ten-bit alphanumeric payee code which identifies the payee entity, preferably by tax identification number. Data element 937 is a fifteen-bit numeric payment amount which represents the total of the payments made on behalf of the payor entity to the payee entity.

FIG. 22 is a flowchart representation of a computer program which may be utilized to generate an approved pay sheet like that described by the format report of FIG. 21. The process begins at software block 951, and continues at software block 953, wherein a particular subscriber (the sender of the approved pay sheet) and the trusted intermediary financial institution interface or interact to select an approved pay format. Next, in accordance with software block 955, at defined intervals, the subscriber transmits an approved pay sheet, and for each payment provides:

(1) identification of the record type;
(2) identification of the company by utilization of a company code;
(3) identification of the payment obligation by utilization of a virtual check number which is also known as a "serial number";
(4) a confidential authorization code which is known only by the subscriber and the trusted intermediary financial institution, and which is not known by the service provider;
(5) a payee code which uniquely identifies the recipient of the payment or payments; and
(6) the payment amount.

Next, in accordance with software block 957, the approved paysheet is held by the trusted intermediary financial institution until a "presentment" of a negotiable instrument occurs. The process ends at step 959.

accordance with software block 961, a payment record is developed and recorded for each transaction. Then, an electronic funds transfer is initiated with the payment record appended, for all electronic funds transfers requested during that banking day.

In order to minimize the occurrence of fraud through the alteration of identification of payees or of payment amounts, a positive pay report may be communicated from service provider 11 (of FIG. 1) to trusted intermediary financial institution 13 (also FIG. 1). FIG. 23 is a format report 1001 for a positive pay report. As is shown, the format report 1001 includes title field 1003, page and date fields 1005, 1007, date of creation fields 1009, 1011, change record fields 1013, 1015. The information of the positive pay report is formatted in accordance with the table of format report 1001. The table includes position column 1017, length column 1019, data element column 1021, data type column 1023, and notes column 1025. Data element 1029 is an eight-bit alphanumeric check number, which identifies the negotiable instrument provided by service provider 11. Data element 1031 is a fifteen-bit numeric check amount which identifies the total amount of the payment being made by service provider 11 to a particular one of the plurality of payees 17. Data element 1033 is a sixty-bit alphanumeric payee identifier, which identifies the name of the entity receiving the payment. Data element 1035 is a three-bit alphanumeric company code which identifies the company making the payment. Data element 1037 is a fifteen-bit alphanumeric serial number which elements found in FIG. 23A, so the same reference numerals are utilized. The check detail record 1008 includes data element 1029 which is a two-bit alphanumeric report code, and data element 1031 which is a two-bit alphanumeric record type code. Furthermore, the format report 1008 includes data element 1039 which is an eight-bit numeric check number, data element 1041 which is a three-bit alphanumeric company code, data element 1043 which is a fifteen-bit alphanumeric serial number, and data element 1045 which is a fifteen-bit numeric check sub amount. This data represents the individual payment obligations which are added together to represent the check amount of the report of FIG. 23A. Of course, a variety of payment obligations may be represented in a single check, so the data elements are repeating to identify all further payment obligations which have associated company codes, serial numbers (virtual check numbers), and check sub amounts.

Figure 23C:
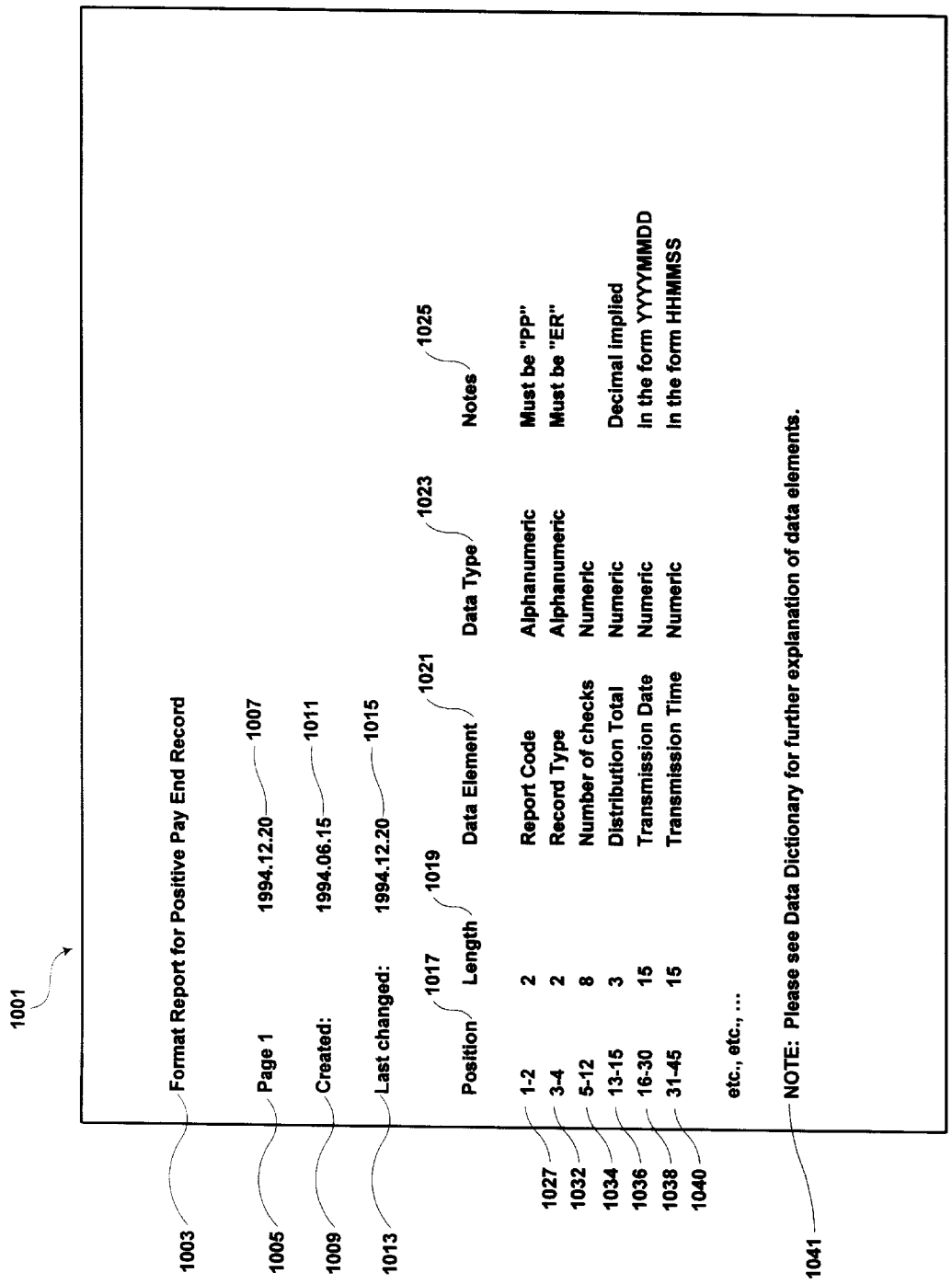
Figure 24:
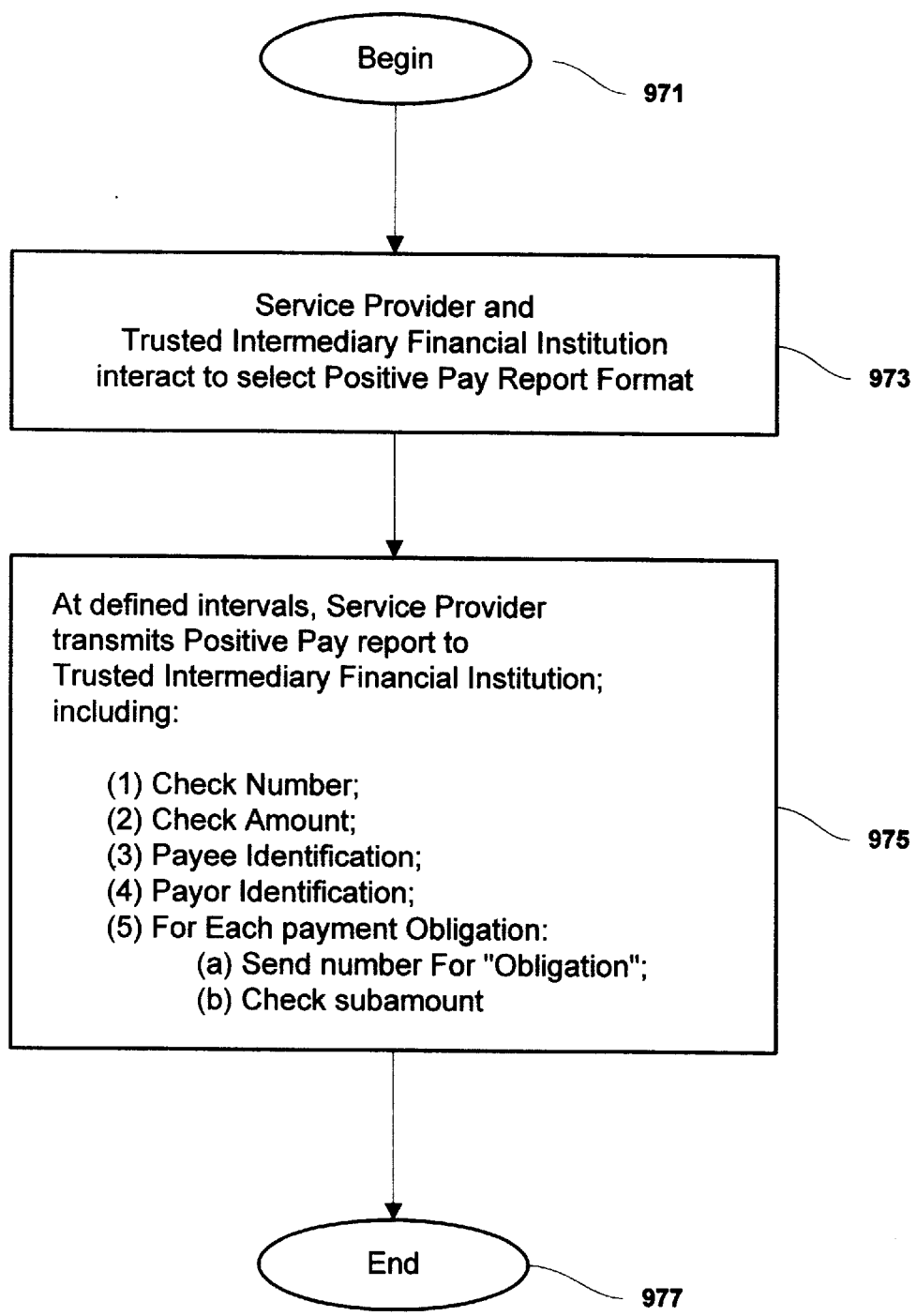
FIG. 24 is a flowchart representation of the data processing implemented generation of a positive pay report in accordance with FIG. 23.

FIG. 23C is similar to FIGS. 23A and 23B and provides a format report 1018 for positive pay end records. Since many of the data elements are similar to those found in FIGS. 23A and 23B, similar reference numerals are utilized. The format report for the positive pay end record includes data element 1029 which is a two-bit alphanumeric report code, data element 1031 which is a two-bit alphanumeric record type, data element 1047 which is a ten-bit numeric number of checks indicator, data element 1049 which is a fifteen-bit numeric distribution total, data element 1051 which is a six-bit numeric transmission date, and data element 1053 which is a six-bit numeric transmission time. As with the other format reports, additional end records may be communicated at the same time and are likewise identified by the number of checks, distribution total, transmission date, and transmission time.

Together, the reports of FIGS. 23A, 23B, and 23C maximize security in the payment system of the present invention.

FIG. 24 is a flowchart representation of the utilization of the positive pay report, in accordance with one preferred embodiment of the present invention. The process begins at software block 971, and continues at software block 973, wherein the service provider 11 and trusted intermediary financial institution 13 interact to select a positive pay report format, such as the format report 1001 of FIG. 23. Next, in accordance with software block 975, at defined intervals, the service provider 11 (of FIG. 1) transmits a positive pay report to the trusted intermediary financial institution 13 (of FIG. 1), including:

(1) a check number of a negotiable instrument;

(2) a check amount for the negotiable instrument;

(3) an identification of the payee;

(4) an identification of the payor; and (5) for each negotiable instrument, payment obligation(s) with serial number(s), and check sub amount(s), for each payment obligation being satisfied.

The process ends at block 977. In this manner, a plurality of payment obligations may be grouped together and represented by a single negotiable instrument which is presented for payment, and which satisfies a plurality of payment obligations. Service provider 11 (of FIG. 1) provides the positive pay report to the trusted intermediary financial institution 13 (of FIG. 1) since service provider 11 is charged with the responsibility of combining and coordinating the payment obligations in a manner which efficiently satisfies the payment obligations. As requests for payment are made, for each presentment, the trusted intermediary financial institution verifies payment by comparing the serial number, amount, and payee of the negotiable instrument with the serial number, amount, and payee of approved payments on the positive pay report. Once a negotiable instrument is verified, it is honored, and a payment record is developed and recorded. FIG. 25 is a pictorial representation of an example of a positive pay transmission for an oil and gas revenue distribution system. The lines which includes "CD" correspond to check detail and serve to identify check numbers, payors, virtual check numbers, and check sub-amounts (in that order from left to right, with vertical lines utilized to separate items). The line that includes "CS" corresponds to a check summary and serves to identify check numbers and check amounts. The line that includes "ER" corresponds to an end record and serves to identify the number of checks, the number of virtual checks, and the total of check amounts.

The negotiable instruments and electronic funds transfers made by service provider 11 in coordinated operation with trusted intermediary financial institution 13 may include a significant amount of detailed and useful information which is either printed on a check stub or communicated electronically to the data processing system under the control of the payee entity. FIGS. 27, 28, and 29 are pictorial representations of the types of information which may be included on the check stubs. Turning first to FIG. 27, check stub 1101 includes a introductory header 1103 which identifies the enclosed (or referenced) check or checks as being made on behalf of the companies listed below for the particular properties and product sales dates. Preferably, the payor entities' trademarks are utilized to provide maximum orientation within the document. In FIG. 27, the document identifies payments as being made on behalf of two payor entities: GPM Gas Corporation and Philbro Energy USA, Inc. Exxon Company USA The trademarks 1105, 1137 are utilized to identify those two payor entities. Several payments are made by service provider 11 on behalf of GPM Gas Corporation. The detail information for each payment is set forth in tabular form. In FIG. 27 rows (1), (2), and (3) define the three for which payment is being made. The column items include item number field 1109, operator/lease name field 1111, county/state field 1113, lease ID/your decimal field 1115, sales date/interest type field 1117, product/unit price field 1119, lease volume/your volume field 1121, lease value/your value field 1123, lease tax/your tax field 1125, lease net/your net field 1126. The check stub further includes total fields 1129, 1131, 1133, 1135 which provide an indication of the total of several of the columns. The check stub further includes a question/complaint field 1107 which directs questions to the particular payor entity, and at least provides an address for such entity.

In the example of FIG. 27, the payment made on behalf of Philbro Energy USA, Inc. Exxon Company USA includes the Philbro Exxon trademark 1137. The payment information is arranged in table form with the item fields 1157 defining the two properties for which payment is made. The properties and payments are identified with reference to the columns including item field 1141, operator/lease name field 1143, county/state field 1145, lease ID/your decimal field 1147, sale date/interest type field 1149, products/unit price field 1151, lease volume/your volume field 1153, lease value/your value field 1154, lease tax/your tax field 1155, lease net/your net field 1156. The check stub further includes total fields 1160, 1159, 1161, 1163 which provide appropriate totals. Additionally, the payment information includes complaint/question statement 1139 which directs inquiries to Philbro Energy USA, Inc. Exxon Company USA and provides at least an address for such questions. As is shown also in FIG. 27, the virtual check numbers associated with each payment may also be provided.

FIG. 28 is a pictorial representation of check stub 1201 for payments made on behalf of governmental entities. The header field 1203 identifies the enclosed checks as representing payment from the governmental agencies listed below. The agency logos 1205, 1219, are utilized to provide maximum orientation within the document. A header 1207 identifies the first payment as being made on behalf of the United States Department of Health and Human Services. The payment information is set forth in tabular form by the account field 1209, payment period field 1211, description field 1213, and amount field 1215. Typically, the account is defined by a social security number or similar unique identifier. The payment period is typically a statutory or regulated interval. The description defines the purpose of the payment, and the amount provides the total amount of the payment. In the example of FIG. 28, the second payment includes a header 1221 which identifies the payment as being made on behalf of the United States Treasury, and arranges the payment information under the account field 1223, payment period field 1225, description field 1227, and amount field 1229. Multiple types of obligations may be satisfied by this instrument, as demonstrated by the rows 1231 which are utilized to distinguish a refund of overpayment and the interest on the refund as separate amounts for the totals. The totals are identified by total fields 1233, 1235.

FIG. 29 is a pictorial representation of a check stub associated with the payment of stock dividends. The check stub 1301 includes a header 1303 which identifies the enclosed check as satisfying the dividend obligations in connection with the particular stock in companies identified below. The logo fields 1305, 1319 utilize company logos or names to identify the particular payments. The payment fields 1307, 1321 provide a textual description of the payment or payments. The payment obligations are set forth in column form under the account field 1309, shares owned field 1311, dividend/share field 1313, and amount field 1315, for Ford Motor Company. Likewise, the dividend obligation for Texas Instruments shares is set forth under account field 1323, shares owned field 1325, dividend/share field 1327, and amount field 1329.

Figure 30:
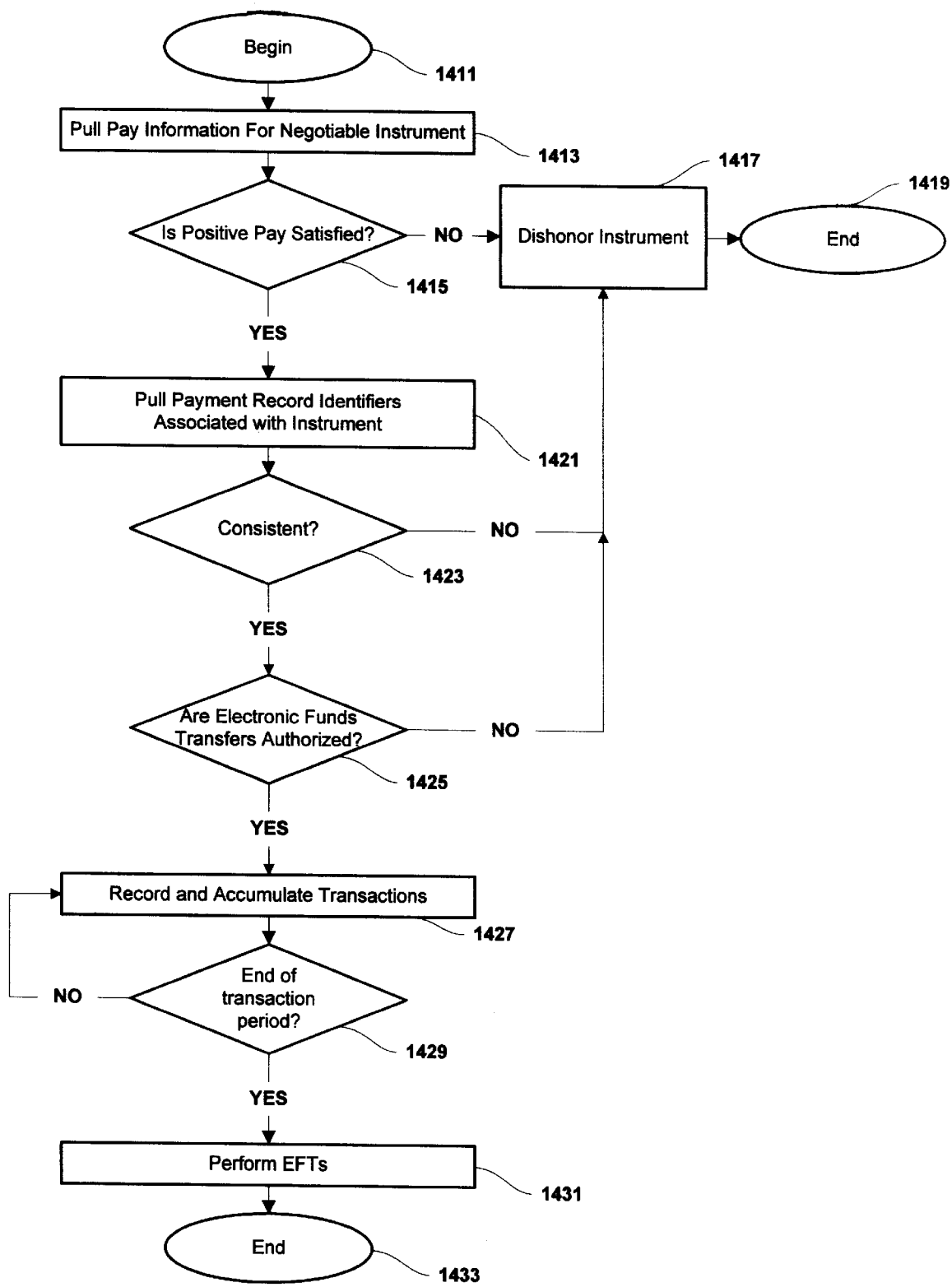
FIG. 30 is a flowchart depiction of a data processing implemented verification of positive pay and authorization information, in accordance with one particular embodiment of the present invention.

FIG. 30 is a flowchart representation of a data processing implemented verification operation, wherein a negotiable instrument is received and a determination is made whether or not to honor the request for payment. The process begins at software block 1411, and continues to software block 1413, wherein a negotiable instrument is received by the trusted intermediary financial institution 13, and the determination must be made whether or not to honor the negotiable instrument. To begin with, the positive pay information is retrieved for the negotiable instrument. The positive pay information was provided by service provider 11, and includes at least an identification of the check number and the amount of the payment. In accordance with software block 1415, the positive pay information is examined and compared to the information contained on the face of the negotiable instrument to determine whether or not to honor the instrument. If the positive pay information is inconsistent with the information carried by the negotiable instrument, the process continues at software block 1417, wherein the negotiable instrument is dishonored, and the process continues at software block 1419 by ending. However, if the operation of software block 1415 determines that the positive pay information is indeed satisfied by the negotiable instrument, the process continues at software block 1421, wherein the payment record identifiers associated with the particular negotiable instruments are retrieved. As stated above, a particular negotiable instrument is likely to represent payment for a number of payment obligations. Each payment obligation has associated with it a payment record identifier which identifies the payment, and which serves as a "virtual check number". Each payment record identifier carries with it at least the amount of the payment. The positive pay report provided by service provider 11 will include identification of all the payment record identifiers associated with the negotiable instrument. Each one of these payment record identifiers is retrieved from memory, and a comparison is made of the total of the amounts represented by the payment record identifiers. In other words, the total amount of the payment must also match. In accordance with the present invention, the payment record identifiers may be from a plurality of payor entities. Therefore, the data processing system of the present invention must quickly and efficiently retrieve the payment record identifiers from a plurality of payment information and payment authorization communications from the payors. If the totals also match, the process continues. The comparison of the total of accumulated amounts for the payment record identifiers is represented in flowchart form at software block 1423. If the information is consistent, the process continues at software block 1425. If the information is inconsistent, the process continues at software block 1417, wherein the negotiable instrument is dishonored. In software block 1425, the data processing system is utilized to determine whether electronic funds transfers have been authorized. In accordance with the present invention, each payment record identifier has associated with it an authorization code. Electronic fund transfers can occur only if the authorization code is present. The authorization code allows for the secure communication between the trusted intermediary financial institution 13 and the plurality of payor entities, should some question arise about payment. A payment authorization is necessary for payment to be made. If in step 1425, it is determined that there is no authorization, the process continues at software block 1417, wherein the negotiable instrument is dishonored; however, if it is determined in software block 1425 that authorization is present, the process continues at software block 1427, wherein the data processing system is utilized to record and accumulate the transactions for a defined interval. In accordance with the present invention, authorized electronics funds transfers are accumulated for a business day. At the end of the business day, a single electronics fund transfer occurs, thus minimizing the costs associated with transferring funds electronically. This process is depicted graphically in the flowchart of FIG. 30 in software block 1429, wherein the data processing system determines whether or not the transaction period has ended; if the transaction period has not ended, the process continues at software block 1427; however, if the transaction period has ended, the process continues at software block 1431, wherein the data processing system is utilized to perform a conventional electronic funds transfer between each particular payor and the service provider 11. A single electronic fund transfer may represent several authorized transfers for a particular payor. The process ends at software block 1433, wherein the bank account for service provider 11 is funded in an amount sufficient to satisfy the negotiable instruments presented during the business day. In accordance with the present invention, the bank account for the service provider is immediately debited for the amount of the negotiable instruments, and payment is tendered through the banking chain in a conventional manner. In accordance with the present invention, the service provider 11 has only momentary possession of the funds, so the possibility of fraudulent or illegal activities is minimized. As an additional benefit, the payors maintained possession and control of their funds until the negotiable instruments must be honored. In this manor, the payors may utilize the capital represented by these amounts in an efficient manner.

Figure 31:
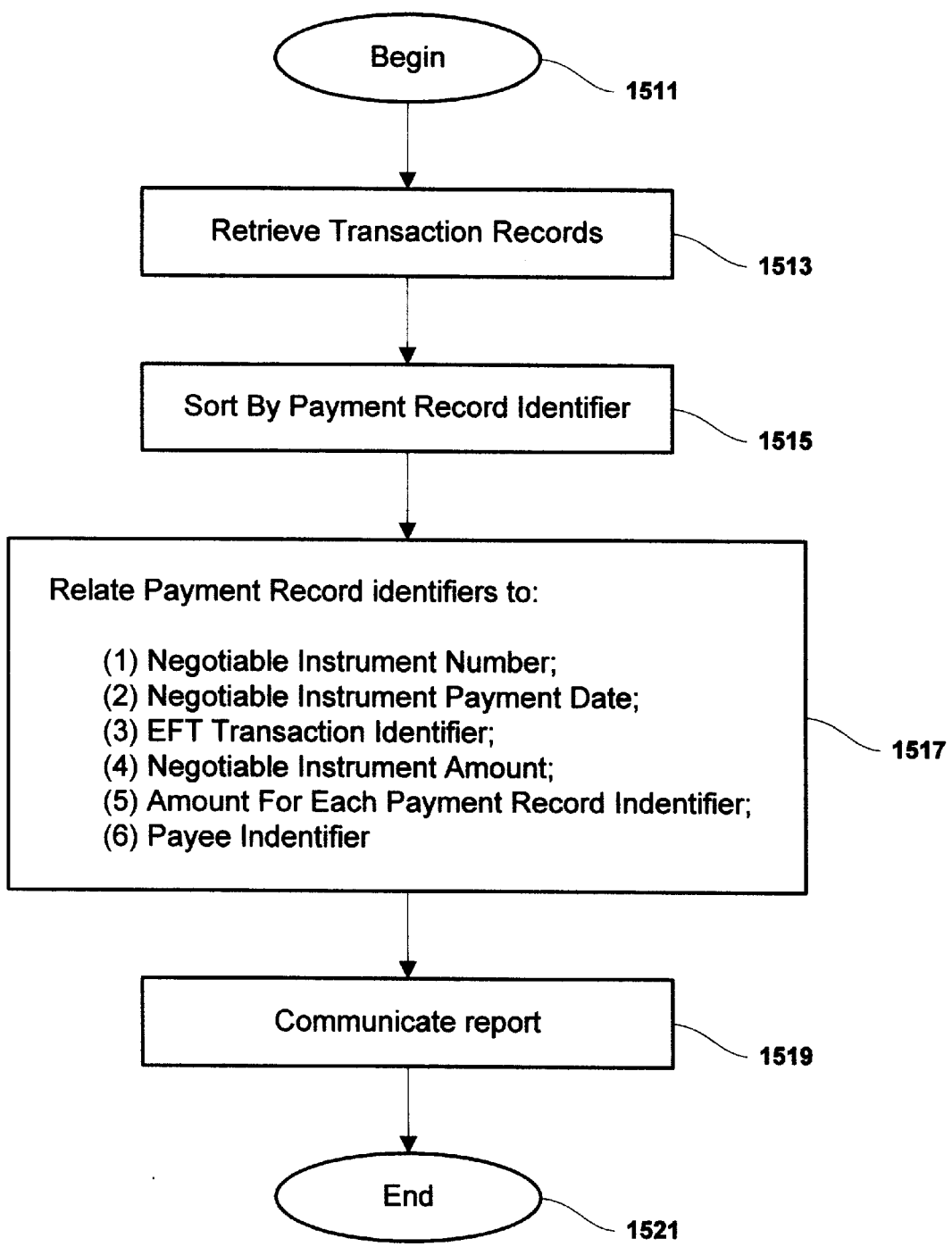
FIG. 31 is a flowchart depiction of a data processing implemented confirmation of payment activities which is provided to the plurality of payor entities.

FIG. 31 is a flowchart representation of a data processing implemented confirmation report provided by trusted intermediary financial institution 13 to each of the plurality of payor entities. The process begins at software block 1511, and continues at software block 1513, wherein the transaction records with the interval in question are retrieved. In accordance with the present invention, satisfaction of the payment obligations is preferably reported in a predetermined periodic manner. For example, the confirmation report may be submitted daily, weekly, or monthly from the trusted intermediary financial institution 13 to each of the plurality of payor entities. The process continues at software block 1515, wherein trusted intermediary financial institution 13 utilizes its data processing system to sort the payment records by payment record identifier. As identified above, the payment record identifier represents the payors "virtual check number" for each payment obligation. In accordance with software block 1517, the trusted intermediary financial institution utilizes a data processing system to relate the payment record identifiers to (1) the negotiable instrument number; (2) the negotiable instrument payment date; (3) the electronic funds transfer transaction identifier, which identifies the particular electronic funds transaction which satisfy the particular obligation; (4) the negotiable instruments number; (5) the amount for each payment record identifier; and, optionally, (6) payee identification. These items are preferably formatted in an agreed upon manner communicated to each of the plurality of payor entities in accordance with software block 1519. The process ends at software block 1521, wherein the plurality of payor entities receive the electronic communication which confirms satisfaction of payment obligations. The plurality of payor entities may update its internal records utilizing the payment record identifiers in order to indicate that the payment obligations have been satisfied. This allows the plurality of payor entities to maintain accurate books, even though the negotiable instruments were not generated by the plurality of payor entities.

In an alternative embodiment of the present invention, payment information may be consolidated and delivered by one or more information service providers, while the payment obligations are directly satisfied by the plurality of payor entities. The service provider may be utilized to consolidate and deliver payment information from a plurality of payor entities to a plurality of payee entities, even though the service provider does not perform payment activities on behalf of the plurality of payee entities. This provides a significant advantage over the prior art, insofar as it allows the plurality of payor entities to satisfy financial obligations, without personally satisfying the associated reporting obligation. This minimizes the administrative and other costs associated with making of payments, and thus allowing the payor entities to efficiently "outsource" the reporting obligations, while maintaining tight control over the satisfaction of the payment obligations.

These objectives may be obtained by the improved method of delivering payment information according to the present invention. The invention is directed to an improved method of delivering payment information from a plurality of payor entities. At least one data processing system is utilized to sort and format payment information of the plurality of payor entities concerning the plurality of payment obligations. Payment information is communicated to the information service provider. At least one data processing system is utilized, which is under the control of the information service provider, to consolidate the payment information concerning the plurality of payment obligations from a plurality of payor entities in accordance with at least one predetermined consolidation criterion. Preferably, the predetermined consolidation criterion comprises grouping the payment information by payee identity, in order to obtain efficiencies in reporting information from a plurality of payors. Then, the payments are directed to the plurality of payees in order to satisfy the plurality of payment obligations. The information service provider operates independently of others to direct consolidated payment information to the plurality of payees, without requiring active interaction between the information service provide and the plurality of payees. Preferably, the consolidated payment information is communicated either electronically or in printed format from the information service provider to the plurality of payees. The plurality of payees are not required to interact, electronically, or otherwise, with the information service provider in order to obtain this information, but, otherwise, payees may elect to receive payment information electronically. In alternative embodiments, the plurality of payor entities may utilize one service provider to direct negotiable instruments to the plurality of payees, while using another service provider to direct consolidated financial information (such as payment information) to the plurality of payees, with each of the service providers operating independently of one another.

Figure 32:
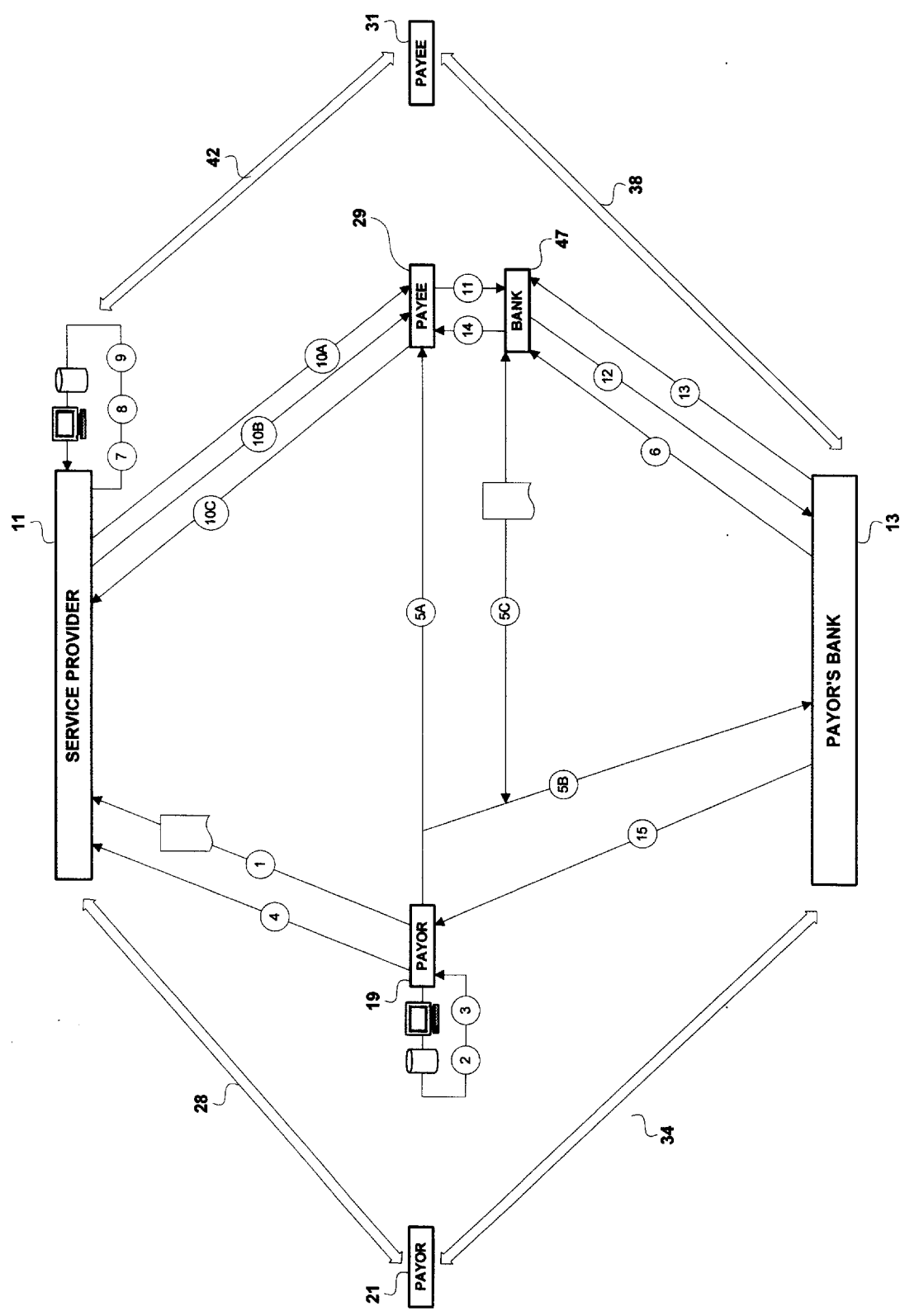
FIG. 32 is a pictorial representation of the preferred improved information reporting system of the present invention.
Figure 33:
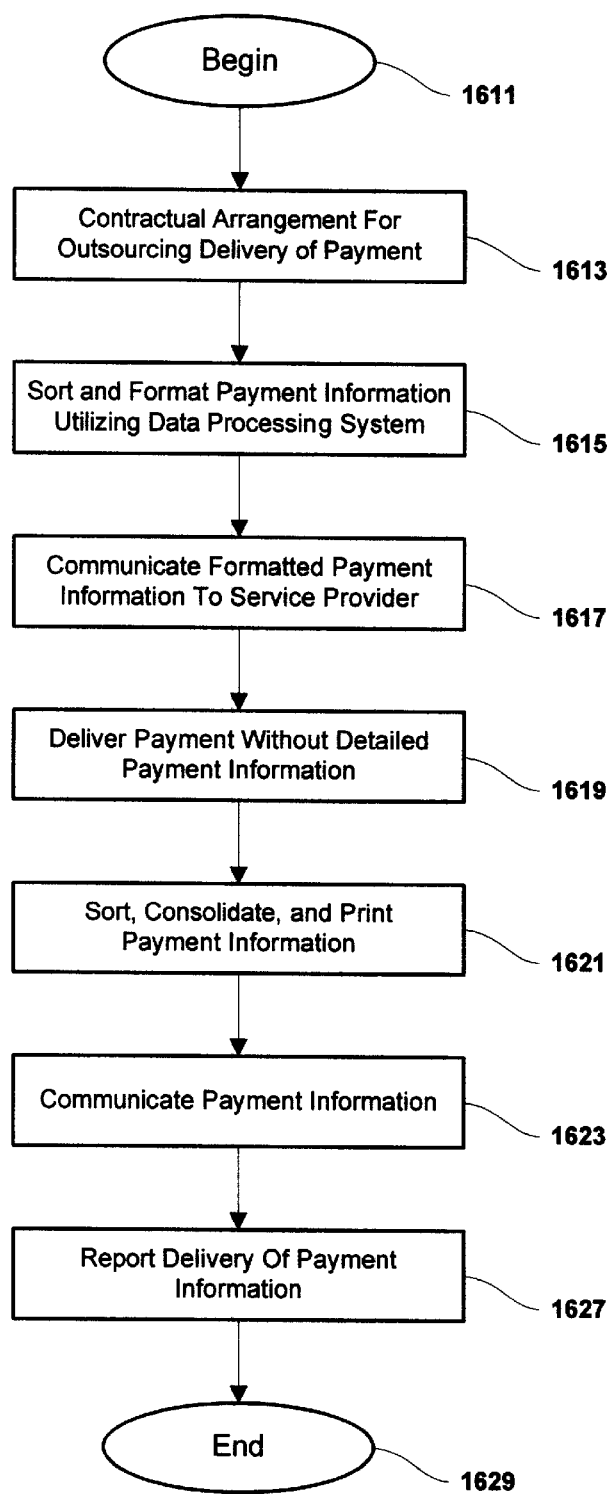
FIG. 33 is a flowchart representation of the steps which must be implemented in order to perform the information reporting activities.

One particular embodiment of the consolidated payment information reporting of the present invention is depicted in block diagram, flowchart, and pictorial form in FIGS. 32, 33, and 34.

FIG. 32 is a pictorial representation of a plurality of steps which are performed by a plurality of payor entities 19 and 21, service provider 11, a plurality of payee entities 29 and 31, and trusted intermediary 13. For purposes of simplicity, the interaction of only one payor entity 19 and one payee entity 29 is described. The present invention contemplates that a plurality of payor entities utilize the service provider in order to consolidate and deliver payment information to a plurality of payee entities. Preferably, the payment information is consolidated in accordance with the identity of the payee entities. As is shown in FIG. 32, only payor 19 and payee 29 will be discussed in detail; however, the relationship between the other payors (such as payors 21) and other payees (such as payee 31) is visually represented by arrows 28, 34, 42, 38. What follows is a step-by-step description of preferred operation.

STEP ONE: In this step, payor 19 and service provider 11 enter into a contractual relationship regarding the delivery of payment information to a plurality of payor entities on behalf of payor 19. Preferably, this contractual relationship is communicated electronically between payor 19 and service provider 11, and provides authorization to service provider 11 to perform the information delivery services which will be described below.

STEPS TWO and THREE: In these steps, payor 19 utilizes a data processing system to first sort, and then format, payment obligation and information. Preferably, the payment information is formatted in a manner which facilitates the electronic communication of the information to service provider 11.

STEP FOUR: In this step, payor 19 communicates the payment information to service provider 11. The payment information may be communicated to service provider 11 via a distributed data processing system, through intermittent connection between payor 19 and service provider 11 utilizing a modem or the like, or by delivering a magnetic or optical media from payor 19 to service provider 11.

STEPS FIVE and SIX: In these steps, payor 19 directs payment to payee 29 and the other payees. Payor 19 may communicate a negotiable instrument to payee 29; this is identified in FIG. 32 as step "5A". Alternatively, payor 19 may utilize an electronic funds transfer to direct funds from the payor's bank 13 to the bank of payee 29; this obligation is depicted in FIG. 32 as steps "5B" and "6". The electronic funds transfer is supported by an electronic funds transfer agreement which is visually represented in FIG. 32 as step "5C". The view of FIG. 32 is simplified, and does not depict the use of automated or other clearing houses to simplify the exposition.

STEPS SEVEN, EIGHT, and NINE: In these steps, service provider 11 utilizes one or more data processing systems under its control to sort and consolidate the payment information by the identity of the payees. In the view of FIG. 32, step "7" corresponds to the sorting activity, and step "8" corresponds to the consolidation activity. Step "9" corresponds to the generation of printed or electronic communication which includes consolidated payment information.

STEP TEN: In step "10", the payment information which has been consolidated in the foregoing steps is communicated to the plurality of payees. There are two alternative techniques for communicating the consolidated payment information to the plurality of payees. One technique is to print a report and direct it to the payees via conventional delivery services such as the United States Postal Service. The alternative technique is to communicate the consolidated payment information to the plurality of payees utilizing an electronic format. In the view of FIG. 32, step "10A" represents the conventional delivery of printed material. In contrast, steps "10B" and "10C" represent the deliver of the consolidated payment information in electronic format is a two step process. In step "10B", the information is delivered to an electronic mail address for payee 29. Once the electronic mail has been opened and/or read by payee 29, a confirmation of receipt is directed back to service provider 11. This confirmation of receipt is represented in FIG. 32 as step "10C". Since not all e-mail servers provide delivery receipts, alternatively service provider may e-mail payee to notify of new data being available, and payee logs on to service provider database and retrieves password protected payee data.

STEPS ELEVEN, TWELVE, THIRTEEN, and FOURTEEN: In these steps, payee 29 presents the negotiable instrument, in accordance with step "11", to its bank. The bank in turn presents the negotiable instrument through a clearinghouse to payor bank 13, in accordance with step "12". The bank 13 honors the instrument, in accordance with step "13", and the payees bank credits the payees account, in accordance with step "14".

STEP FIFTEEN: In accordance with step fifteen, payor bank 13 confirms payment of the negotiable instruments to payor 19.

FIG. 33 is a flowchart representation of the steps utilized in performing the information providing service. The process commences at software block 1611, and continues at software block 1613, wherein a contractual arrangement for outsourcing of the delivery of payment information is reached. This flowchart step corresponds to step number one in FIG. 32. Then, the process commences at software block 1615, wherein each payor sorts and formats the payment information utilizing its own data processing system. This corresponds to steps two and three of FIG. 32. The formatted payment information is then communicated to service provider 11, in accordance with software block 1617. This corresponds to step four in FIG. 32. Then, in accordance with software block 1619, payor 19 delivers the payment without including the detailed payment information. This corresponds to steps 5A, 5B, and 5C in FIG. 32. Then, in accordance with software block 1621, service provider 11 sorts, consolidates, and prints the payment information. This corresponds to steps seven, eight, and nine of FIG. 32. Then, service provider 11 communicates the payment information, in accordance with software block 1623. This corresponds to steps 10A, 10B, and 10C. In accordance with software block 1627, service provider 11 may optionally report delivery of the payment information. The process ends at software block 1629.

FIG. 34 is a pictorial representation of printed information which may be provided by service provider 11 to the particular one of the plurality of payees. The payment information includes the names of the payors, the amounts of the payments, and detailed information regarding the payment. The printed material identifies the source of the payment in as-detailed a manner as is desired by the plurality of payors. The report is similar to the payment information of FIG. 27, so the same reference numerals are utilized.

A variety of alternative arrangements can be utilized to deliver the payment information utilizing a service provider. As stated above, the plurality of payors may direct negotiable instruments to the plurality of payees. Alternatively, the plurality of payors may utilize electronic funds transfer operations in order to transfer funds from their accounts to the payees accounts. Alternatively, the plurality of payor entities may utilize a different service provider to direct negotiable instruments to the plurality of payee entities on behalf of the plurality of payor entities. In this way, the plurality of payors may divide the services between an information service provider and a payment service provider. The payment service provider may be optionally utilized to consolidate payment obligations into a single negotiable instrument, for each payee. Alternatively, the payment service provider may initiate electronic funds transfers which effect the transfer of funds between accounts under the direct or indirect control of the plurality of payors and the accounts under the direct or indirect control of the plurality of payees. Optionally, the payment service provider may bundle the electronic fund transfers together in order to minimize the total number of electronic funds transfers needed in order to effect payment for a plurality of payors. The service provider may utilize one or more data processing systems under its control to sort the payment information by at least one of (1) the payee identity, and (2) a preselected time interval for the reporting. The reporting interval may be defined by statute or by commercial practices in a particular industry. For oil and gas transactions, that payment interval may be as long as one year (when allowed by statute) or as short as one month. Utilizing the information reporting system for reporting payment information relating to government programs and entitlements may allow longer or shorter intervals. The information service provider may communicate the payment information either electronically to the plurality of payees, or may communicate printed consolidated payment information to the plurality of payees.

While the invention has been shown in only one of its forms, it is not thus limited but is susceptible to various changes and modifications without departing from the spirit thereof.

What is claimed is:

1. An improved method of making payments from a plurality of payor entities to a plurality of payee entities through the coordinated operation of a service provider and a trusted intermediary financial institution, comprising the method steps of:

utilizing at least one data processing system to sort and format payment information separately for each of said plurality of payor entities concerning a plurality of payment obligations;

communicating said payment information separately from each of said plurality of payor entities to said service provider and said trusted intermediary financial institution;

utilizing at least one data processing system under control of said service provider to consolidate said plurality of payment obligations from said plurality of payor entities in accordance with at least one predetermined consolidation criterion;

directing a plurality of negotiable instruments from said service provider to said plurality of payees in order to satisfy said plurality of payment obligations;

utilizing at least one data processing system under control of said trusted intermediary financial institution to transfer automatically funds in order to honor said plurality of negotiable instruments.

2. An improved method of making payments according to claim 1, wherein said at least one consolidation criterion comprises grouping said plurality of payment obligations by payee identity in order to minimize the number of negotiable instruments generated.

3. An improved method of making payments according to claim 1 further comprising the method steps of:

communicating data processing system readable payment authorization information from said plurality of payor entities to said trusted intermediary financial institution; and utilizing said at least one data processing system under control of said trusted intermediary financial institution to verify said data processing system readable payment authorization information from said plurality of payor entities prior to honoring said plurality of negotiable instruments.

4. An improved method of making payments according to claim 3, wherein said data processing system readable payment authorization information includes:

(a) a payment record identifier for each payment obligation of said plurality of payment obligations;

(b) an identification of payment amount for each payment obligation of said plurality of payment obligations; and (c) an authorization code uniquely associated with each payment record identifier.

5. An improved method of making payments according to claim 1, further comprising:

communicating data processing system readable payment verification information from said service provider to said trusted intermediary financial institution;

utilizing said at least one data processing system under control of said trusted intermediary financial institution to verify said plurality of negotiable instruments utilizing at least said data processing system readable payment verification information from said service provider.

6. An improved method of making payments according to claim 5, wherein said data processing system readable payment verification information includes:

(a) an identification of each of said plurality of negotiable instruments;

(b) an identification of the payment amount of each of said plurality of negotiable instruments; and (c) an identification of each payment obligation satisfied by each of said plurality of negotiable instruments.

7. An improved method of making payments according to claim 1, further comprising the method steps of:

communicating data processing system readable payment authorization information from said plurality of payor entities to said trusted intermediary financial institution;

communicating data processing system readable payment verification information from said service provider to said trusted intermediary financial institution;

utilizing said at least one data processing system under control of said trusted intermediary financial institution to verify said plurality of negotiable instruments utilizing both of (1) said data processing system readable payment authorization information from said plurality of payor entities, and (2) said data processing system readable payment verification information from said service provider.

8. An improved method of making payments according to claim 1, further comprising the method step of:

communicating data processing system readable payment confirmation information from at least one of (1) said service provider and (2) said trusted intermediary financial institution to said plurality of payors.

9. An improved method of making payments according to claim 8, wherein said data processing system readable payment information includes:

(a) a payment record identifier for each payment obligation of said plurality of payment obligations which has been satisfied;

(b) an identification of each negotiable instrument utilized by said service provider to satisfy said plurality of payment obligations.

10. An improved method of making payments according to claim 1 further comprising the method steps of:

establishing a payor banking account for each of said plurality of payors;

allowing predefined access to said payor banking account for each said plurality of payors by said trusted intermediary financial institution;

establishing a service provider banking account;

allowing predefined access to said service provider banking account by said trusted intermediary financial institution;

utilizing at least one data processing system under control of said trusted intermediary financial institution to transfer automatically funds between particular ones of said payor banking accounts for each of said plurality of payors and said service provider banking account in order to honor verified ones of said plurality of negotiable instruments.

11. An improved method of making payments according to claim 10, wherein said step of utilizing at least one data processing system under control of said trusted intermediary financial institution to transfer automatically funds comprises:

utilizing at least one data processing system under control of said trusted intermediary financial institution to transfer automatically funds between particular ones of said payor banking accounts for each of said plurality of payors and said service provider banking account utilizing electronic funds transfers in order to honor verified ones of said plurality of negotiable instruments.

12. An improved method of making payments according to claim 11, further comprising:

grouping electronic funds transfer operations for a predefined time interval for particular ones of said payor banking accounts in order to minimize the number of electronic funds transfers.

13. An improved method of making payments according to claim 1, further comprising:

providing with each of said plurality of negotiable instruments a report which provides detailed information relating to each of said plurality of payment obligations satisfied by said negotiable instruments.

14. A means for making payments from a plurality of payor entities to a plurality of payee entities through the coordinated operation of said plurality of payor entities, a service provider, and a trusted intermediary financial institution, comprising:

means for utilizing at least one data processing system to sort and format payment information separately for each of said plurality of payor entities concerning a plurality of payment obligations;

means for communicating said payment information separately from each of said plurality of payor entities to said service provider and said trusted intermediary financial institution;

means for utilizing at least one data processing system under control of said service provider to consolidate said plurality of payment obligations from said plurality of payor entities in accordance with at least one predetermined consolidation criterion;

means for directing a plurality of negotiable instruments from said service provider to said plurality of payees in order to satisfy said plurality of payment obligations;

means for utilizing at least one data processing system under control of said trusted intermediary financial institution to transfer funds automatically in order to honor said plurality of negotiable instruments.

15. A means for payments according to claim 14, wherein said at least one consolidation criterion comprises grouping said plurality of payment obligations by payee identity in order to minimize the number of negotiable instruments generated.

16. A means for making payments according to claim 14 further comprising:

means for communicating data processing system readable payment authorization information from said plurality of payor entities to said trusted intermediary financial institution; and means for utilizing said at least one data processing system under control of said trusted intermediary financial institution to verify said data processing system readable payment authorization information from said plurality of payor entities.

17. A means for making payments according to claim 14, wherein said data processing system readable payment authorization information includes:

(a) a payment record identifier for each payment obligation of said plurality of payment obligations;

(b) an identification of payment amounts for each payment obligation of said plurality of payment obligations; and (c) an authorization code uniquely associated with each payment record identifier.

18. A means for payments according to claim 14, further comprising:

means for communicating data processing system readable payment verification information from said service provider to said trusted intermediary financial institution;

means for utilizing said at least one data processing system under control of said trusted intermediary financial institution to verify said plurality of negotiable instruments utilizing at least said data processing system readable payment verification information from said service provider.

19. A means for making payments according to claim 18, wherein said data processing system readable payment verification information includes:

(a) an identification of each of said plurality of negotiable instruments;

(b) an identification of the payment amount of each of said plurality of negotiable instruments; and (c) an identification of each payment obligations satisfied by each of said plurality of negotiable instruments.

20. A means for making payments according to claim 14, further comprising:

means for communicating data processing system readable payment authorization information from said plurality of payor entities to said trusted intermediary financial institution;

means for communicating data processing system readable payment verification information from said service provider to said trusted intermediary financial institution;

means for utilizing said at least one data processing system under control of said trusted intermediary financial institution to verify said plurality of negotiable instruments utilizing both of (1) said data processing system readable payment authorization information from said plurality of payor entities, and (2) said data processing system readable payment verification information from said service provider.

21. A means for making payments according to claim 14, further comprising:

means for communicating data processing system readable payment confirmation information from at least one of (1) said service provider and (2) said trusted intermediary financial institution to said plurality of payors.

22. A means for making payments according to claim 21, wherein said data processing system readable payment information includes:

(a) a payment record identifier for each payment obligation of said plurality of payment obligations which has been satisfied;

(b) an identification of each negotiable instrument utilized by said service provider to satisfy said plurality of payment obligation.

23. A means for making payments according to claim 14, further comprising:

establishing a payor banking account for each of said plurality of payors;

allowing predefined access to said payor banking account for each of said plurality of payors by said trusted intermediary financial institution;

establishing a service provider banking account;

allowing predefined access to said service provider banking account by said trusted intermediary financial institution;

utilizing at least one data processing system under control of said trusted intermediary financial institution to transfer automatically funds between particular ones of said payor banking accounts for each of said plurality of payors and said service provider banking account in order to honor verified ones of said plurality of negotiable instruments.

24. A means for making payments according to claim 23, wherein said step of utilizing at least one data processing system under control of said trusted intermediary financial institution to transfer automatically funds comprises:

means for utilizing at least one data processing system under control of said trusted intermediary financial institution to transfer automatically funds between particular ones of said payor banking accounts for each of said plurality of payors and said service provider banking account utilizing electronic funds transfers in order to honor verified ones of said plurality of negotiable instruments.

25. A means for making payments according to claim 24, further comprising:

means for grouping electronic funds transfer operations for a predefined time interval for particular ones of said payor banking accounts in order to minimize the number of electronic funds transfers.

26. A means for making payments according to claim 24, further comprising:

means for providing with each of said plurality of negotiable instruments a report which provides detailed information relating to each payment obligation satisfied by said negotiable instruments.

27. An improved method of making payments from a plurality of payor entities to a plurality of payee entities through the coordinated operation of said plurality of payor entities, a service provider, and a trusted intermediary financial institution, comprising the method steps of:

utilizing at least one data processing system to sort and format payment information from said plurality of payor entities concerning a plurality of payment obligations;

communicating said payment information to said service provider and said trusted intermediary financial institution;

utilizing at least one data processing system under control of said service provider to consolidate said plurality of payment obligations from said plurality of payor entities in accordance with at least one predetermined consolidation criterion;

directing a plurality of negotiable instruments from said service provider to said plurality of payees in order to satisfy said plurality of payment obligations;

utilizing at least one data processing system under control of said trusted intermediary financial institution to (1) verify said plurality of negotiable instruments, and (2) automatically transfer funds in order to honor verified ones of said plurality of negotiable instruments.

28. An improved method of making payments according to claim 27, wherein said at least one consolidation criterion comprises grouping said plurality of payment obligations by payee identity in order to minimize the number of negotiable instruments generated.

29. An improved method of making payments according to claim 27 further comprising the method steps of:

communicating data processing system readable payment authorization information from said plurality of payor entities to said trusted intermediary financial institution; and utilizing said at least one data processing system under control of said trusted intermediary financial institution to verify said plurality of said payment authorization information from said plurality of payor entities.

30. An improved method of making payments according to claim 29, wherein said data processing system readable payment authorization information includes:

(a) a payment record identifier for each payment obligation of said plurality of payment obligations;

(b) an identification of payment amounts for each payment obligation of said plurality of payment obligations; and (c) an authorization code uniquely associated with each payment record identifier.

31. An improved method of making payments according to claim 27, further comprising:

communicating data processing system readable payment verification information from said service provider to said trusted intermediary financial institution;

utilizing said at least one data processing system under control of said trusted intermediary financial institution to verify said plurality of negotiable instruments utilizing at least said data processing system readable payment verification information from said service provider.

32. An improved method of making payments according to claim 31, wherein said data processing system readable payment verification information includes:

(a) an identification of each of said plurality of negotiable instruments;

(b) an identification of the payment amount of each of said plurality of negotiable instruments; and (c) an identification of each payment obligation satisfied by each of said plurality of negotiable instruments.

33. An improved method of making payments according to claim 27, further comprising the method steps of:

communicating data processing system readable payment authorization information from said plurality of payor entities to said trusted intermediary financial institution;

communicating data processing system readable payment verification information from said service provider to said trusted intermediary financial institution;

utilizing said at least one data processing system under control of said trusted intermediary financial institution to verify said plurality of negotiable instruments utilizing both of (1) said data processing system readable payment authorization information from said plurality of payor entities, and (2) said data processing system readable payment verification information from said service provider.

34. An improved method of making payments according to claim 27, further comprising the method step of:

communicating data processing system readable payment confirmation information from at least one of (1) said service provider and (2) said trusted intermediary financial institution to said plurality of payors.

35. An improved method of making payments according to claim 34, wherein said data processing system readable payment information includes:

(a) a payment record identifier for each payment obligation of said plurality of payment obligations which has been satisfied;

(b) an identification of each negotiable instrument utilized by said service provider to satisfy said plurality of payment obligations.

36. An improved method of making payments according to claim 27, further comprising the method steps of:

establishing a payor banking account for each of said plurality of payors;

allowing predefined access to said payor banking account for each of said plurality of payors by said trusted intermediary financial institution;

establishing a service provider banking account;

allowing predefined access to said service provider banking account by said trusted intermediary financial institution;

utilizing at least one data processing system under control of said trusted intermediary financial institution to transfer automatically funds between particular ones of said payor banking accounts for each of said plurality of payors and said service provider banking account in order to honor verified ones of said plurality of negotiable instruments.

37. An improved method of making payments according to claim 36, wherein said step of utilizing at least one data processing system under control of said trusted intermediary financial institution to transfer automatically funds comprises:

utilizing at least one data processing system under control of said trusted intermediary financial institution to transfer automatically funds between particular ones of said payor banking accounts for each of said plurality of payors and said service provider banking account utilizing electronic funds transfers in order to honor verified ones of said plurality of negotiable instruments.

38. An improved method of making payments according to claim 37, further comprising:

grouping electronic funds transfer operations for a predefined time interval for particular ones of said payor banking accounts in order to minimize the number of electronic funds transfers.

39. An improved method of making payments according to claim 27, further comprising:

providing with each of said plurality of negotiable instruments a printed report which provides detailed information relating to each of said plurality of payment obligations satisfied by said negotiable instruments.

40. An improved method of making payments from a plurality of payor entities to a plurality of payee entities through a service provider, comprising the method steps of:

(a) obtaining authorization from said plurality of payor entities which allows said service provider to make payments on behalf of said plurality of payor entities to said plurality of payee entities;

(b) arranging for at least one trusted intermediary financial institution to periodically receive data processing system readable payment information and payment authorization from said plurality of payor entities, and to transfer automatically funds in amounts consistent with at least said payment information to said service provider;

(c) said payment information and payment authorization including at least:

(1) a payment record identifier uniquely associated with each payment obligation;

(2) an identification of payment amounts for each of said plurality of payment obligations; and (3) an authorization code uniquely associated with each payment record identifier;

(d) periodically communicating data processing system readable payment instructions from said plurality of payor entities to said service provider;

(e) said data processing system readable payment instructions including at least:

(1) an identification of each of said plurality of payee entities;

(2) an identification of payment amounts for each of said plurality of payee entities; and (3) a payment record identifier uniquely associated with payment obligation;

(f) utilizing said service provider to (1) consolidate payment instructions from said plurality of payor entities utilizing at least one data processing system, (2) direct a negotiable instrument to each of said plurality of payee entities, (3) generate payment verification information for said negotiable instruments, and (4) communicate said payment verification information to said trusted intermediary financial institution; and (g) upon receipt of a negotiable instrument from any of said plurality of payee entities, utilizing said trusted intermediary financial institution to (1) verify said request for payment, and (2) transfer funds between said plurality of payor entities and said service provider to effect payment;

(h) obtaining authorization from said plurality of payor entities, which allows said service provider to make payments on behalf of said payor entities to said plurality of payee entities, substantially concurrently with said step of periodically communicating payment instructions from said plurality of payor entities to said service provider.

41. An improved method of making payments according to claim 40, wherein verification of said request for payment includes utilizing at least said payment verification information.

42. An improved method of making payments according to claim 40, wherein verification of said request for payment includes utilizing at least said payment information and payment authorization.

43. An improved method of making payments according to claim 40, wherein said step of arranging comprises:

arranging for at least one trusted intermediary financial institution to (1) periodically receive payment information and payment authorization from said plurality of payor entities, with said payment information and payment authorization comprising an electronic record which is transmittable within a distributed data processing system, and (2) automatically transfer funds in amounts consistent with at least said payment information to said service provider.

44. An improved method of making payments according to claim 40, wherein each of said payment record identifiers comprise a transaction identifier established by a particular one of said plurality of payor entities to represent a particular payment transaction.

45. An improved method of making payments according to claim 40, wherein said payment information is arranged in a data block with a plurality of predefined data fields provided to define at least:
 (1) a payment record identifier uniquely associated with each payment obligation;
 (2) an identification of payment amounts for each of said plurality of payment obligations; and
 (3) an authorization code uniquely associated with each payment record identifier.

46. An improved method of making payments, according to claim 40:
 wherein payment obligations arise from relationships monitored at least by said plurality of payor entities;
 said method further including:
 for each of said plurality of payor entities:
  (1) searching at least one data base for at least one particular payment obligation for a preselected time interval; and
  (2) grouping payment obligations by at least identity of said plurality of payee entities.

47. An improved method of making payments according to claim 40, further including:
 (i) automatically generating a summary of payment information for said plurality of payor entities; and
 (j) periodically communicating said summary of payment information from said plurality of payor entities to said service provider.

48. An improved method of making payments according to claim 47, further including:
 (k) utilizing said summary of payment to automatically perform a data integrity verification operation.

49. An improved method of making payments, according to claim 40, wherein said trusted intermediary financial institution is utilized to verify a request for payment by comparing information from said negotiable instrument with positive pay reports provided by said service provider, and then verifying payments with payment information and payment authorization data communicated by said plurality of payors.

50. An improved means for making payments from a plurality of payor entities to a plurality of payee entities through a service provider, comprising:
 (a) means for obtaining authorization from said plurality of payor entities which allows said service provider to make payments on behalf of said plurality of payor entities to said plurality of payee entities;
 (b) means for periodically communicating payment information and payment authorization from said plurality of payor entities to at least one trusted intermediary financial institution,
 (c) means for automatically transferring funds in amounts only consistent with said payment information to said service provider;
 (d) said payment information including at least:
  (1) a payment record identifier uniquely associated with each payment obligation; and
  (2) an identification of payment amounts for each of said plurality of payment obligations; and
  (3) an authorization code uniquely associated with each payment record identifier;
 (e) means for periodically communicating payment instructions from said plurality of payor entities to said service provider;
 (f) said payment instructions including at least:
  (1) an identification of each of said plurality of payee entities;
  (2) an identification of payment amounts for each of said plurality of payee entities; and
  (3) a payment record identifier uniquely associated with each payment obligation;
 (g) means for utilizing said service provider to (1) consolidate payment instructions from said plurality of payor entities, (2) direct a negotiable instrument to each of said plurality of payee entities, (3) generate payment verification information for said negotiable instruments, and (4) communicate said payment verification information to said trusted intermediary financial institution; and
 (h) means for receiving a negotiable instrument from any of said plurality of payee entities, and utilizing said trusted intermediary financial institution to (1) verify said request for payment, and (2) automatically transfer funds between said plurality of payor entities and said service provider in amounts necessary to allow payment;
 (i) means for obtaining authorization from said plurality of payor entities, which allows said service provider to make payments on behalf of said payor entities to said plurality of payee entities, substantially concurrently with said step of periodically communicating payment instructions from said plurality of payor entities to said service provider.

51. An improved means for making payments according to claim 50, wherein each of said payment record identifiers comprises a payment record identifier established by a particular one of said plurality of payor entities to represent a particular payment transaction.

52. An improved means for making payments according to claim 50, wherein said payment information is arranged in a data block with a plurality of predefined data fields provided to define at least:
 (1) a payment record identifier uniquely associated with each record payment;
 (2) an identification of payment amounts for each of said plurality of payee entities; and
 (3) an authorization code uniquely associated with each payment record identifier.

53. An improved means for making payments, according to claim 50:
 wherein payment obligations arise from relationships monitored at least by said plurality of payor entities;
 said improved means for making payments further including:
  (j) means for searching at least one data base for at least one particular relationship for a preselected time interval; and
  (k) grouping payment obligations by at least identity of said plurality of payee entities.

54. An improved means for making payments according to claim 51, further including:
 (i) means for automatically generating a summary of payment information for each of said plurality of payor entities; and (j) means for periodically communicating said summary of payment information from said plurality of payor entities to said service provider.

55. An improved means for making payments according to claim 54, further including:
   (l) means for utilizing said summary of payment to perform automatically a data integrity verification operation.

56. An improved method of making payments, according claim 50, wherein said trusted intermediary financial institution is utilized to verify a request for payment by comparing information from said negotiable instrument with payment authorization data communicated by said service provider.

57. An improved means for making payments from a plurality of payor entities to a plurality of payee entities through a service provider, comprising:
   (a) means for obtaining authorization from said plurality of payor entities which allows said service provider to make payments on behalf of said plurality of payor entities to said plurality of payee entities;
   (b) means for periodically communicating payment information and payment authorization from said plurality of payor entities to at least one trusted intermediary financial institution,
   (c) data processing implemented means for automatically transferring funds in amounts only consistent with said payment information to
   said service provider;
   (d) said payment information and payment authorization including at least:
   (1) a payment record identifier uniquely associated with each payment obligation;
   (2) an identification of payment amounts for each of said plurality of payment obligations; and
   (3) an authorization code uniquely associated with each payment record identifier;
   (e) means for periodically communicating payment instructions from said plurality of payor entities to said service provider;
   (f) said payment instructions including at least:
   (1) an identification of each of said plurality of payee entities;
   (2) an identification of payment amounts for each of said plurality of payee entities; and
   (3) a payment record identifier uniquely associated with each payment obligation;
   (g) data processing implemented means for utilizing said service provider to (1) consolidate payment instructions from said plurality of payor entities, (2) direct a negotiable instrument to each of said plurality of payee entities, (3) generate payment verification information for said negotiable instruments, and (4) communicate said payment verification information to said trusted intermediary financial institution; and
   (h) data processing implemented means for receiving a negotiable instrument from any of said plurality of payee entities, and utilizing said trusted intermediary financial institution to (1) verify said request for payment, and (2) support the automatic transfer of funds between said plurality of payor entities and said service provider in amounts necessary to allow payment.

58. An improved means for making payments according to claim 57, wherein said means for obtaining authorization comprises:
   means for obtaining authorization from said plurality of payor entities, which allows said service provider to make payments on behalf of said payor entities to said plurality of payee entities, substantially concurrently with said step of periodically communicating payment instructions from said plurality of payor entities to said service provider.

59. An improved means for making payments according to claim 57, wherein each of said payment record identifier comprises a payment record identifier established by a particular one of said plurality of payor entities to represent a particular payment transaction.

60. An improved means for making payments according to claim 57, wherein said payment information is arranged in a data block with a plurality of predefined data fields provided to define at least:
   (1) a payment record identifier uniquely associated with each payment obligation;
   (2) an identification of payment amounts for each of said payment obligations; and
   (3) an authorization code uniquely associated with each payment record identifier.

61. An improved means for making payments, according to claim 57:
   wherein payment obligations arise from relationships monitored at least by said plurality of payor entities;
   said improved means for making payments further including:
   (i) data processing implemented means for searching at least one data base for at least one particular payment for a preselected time interval; and
   (j) grouping payment obligations by at least identity of said plurality of payee entities.

62. An improved means for making payments according to claim 57, further including:
   (i) data processing implemented means for automatically generating a summary of payment information for each of said plurality of payor entities; and
   (j) data processing implemented means for periodically communicating said summary of payment information from said plurality of payor entities to said service provider.

63. An improved means for making payments according to claim 62, further including:
   (k) data processing implemented means for utilizing said summary of payment information to perform automatically a data integrity verification operation.

64. An improved method of making payments, according to claim 57, wherein said trusted intermediary financial institution utilizes a data processing system to compare payment verification information with said negotiable instrument, and then verify a request for payment by comparing information from said negotiable instrument with payment information and payment authorization data communicated by said plurality of payor entities.

65. An improved means for making payments according to claim 57, further including:
   data processing implemented means for correlating said negotiable instruments generated by said service provider and said payment information and payment authorization which was communicated by said plurality of payors to said at least one trusted intermediary financial institution.

66. An improved method in a distributed data processing system of making payments from a plurality of payor entities to a plurality of payee entities through a service provider, comprising the method steps of:

(a) obtaining authorization from said plurality of payor entities which allows said service provider to make payments on behalf of said plurality of payor entities to said plurality of payee entities;

(b) arranging for at least one trusted intermediary financial institution to periodically receive through said distributed data processing system (1) payment identification information (2) payment information and (3) payment authorization from said plurality of payor entities, and automatically transfer funds through said distributed data processing system in amounts only consistent with said payment information to said service provider;

(c) said payment information including at least:

(1) a payment record identifier uniquely associated with payment obligation;

(2) an identification of payment amounts for each of said payment obligations; and (3) an authorization code uniquely associated with each payment record identifier;

(d) periodically communicating through said distributed data processing system payment instructions from said plurality of payor entities to said service provider;

(e) said payment instructions including at least:

(1) an identification of each of said plurality of payee entities;

(2) an identification of payment amounts for each payment obligation; and (3) a payment record identifier uniquely associated with each payment amount;

(f) utilizing said service provider to (1) consolidate payment instructions from said plurality of payor entities, (2) direct a negotiable instrument to each of said plurality of payee entities, (3) generate payment verification information for said negotiable instruments, and (4) communicate said payment verification information to said trusted intermediary financial institution through said distributed data processing system; and (g) upon receipt of a negotiable instrument from any of said plurality of payee entities, utilizing said trusted intermediary financial institution to (1) verify said request for payment, and (2) automatically transfer funds through said distributed data processing system between said plurality of payor entities and said service provider, necessary to allow payment.

67. An improved method of making payments according to claim 66, wherein said payment information is arranged in a data block with a plurality of predefined data fields provided to define at least:

(1) a payment record identifier uniquely associated with each payment obligation;

(2) an identification of payment amounts for each of said payment obligations; and (3) an authorization code uniquely associated with each payment record identifier.

68. An improved method of making payments, according to claim 66:

wherein payment obligations arise from relationships monitored at least by said plurality of payor entities;

said improved method of making payments further including:

for each of said plurality of payor entities:

(1) utilizing said distributed data processing system for searching at least one data base for at least one particular payment obligation for a preselected time interval; and (2) utilizing said distributed data processing system for grouping payment obligations by at least identity of said plurality of payee entities.

69. An improved method of making payments according to claim 66, further including:

(h) utilizing said distributed data processing system for automatically generating a summary of payment information for each of said plurality of payor entities; and (i) utilizing said distributed data processing system for periodically communicating said summary of payment information from said plurality of payor entities to said service provider.

70. An improved method of making payments according to claim 69, further including:

(j) utilizing said distributed data processing system for utilizing said summary of payment to automatically perform a data integrity verification operation.

* * * * *